(12) United States Patent
Meadows

(10) Patent No.: US 8,639,753 B1
(45) Date of Patent: Jan. 28, 2014

(54) METHODS AND APPARATUS FOR INCREASING THE EFFICIENCY OF ELECTRONIC DATA STORAGE AND TRANSMISSION

(71) Applicant: Squash Compression, LLC, Highlands Ranch, CO (US)

(72) Inventor: Michael D. Meadows, Highlands Ranch, CO (US)

(73) Assignee: Squash Compression, LLC, Highlands Ranch, CO (US)

( * ) Notice: Subject to any disclaimer, the term of this patent is extended or adjusted under 35 U.S.C. 154(b) by 0 days.

(21) Appl. No.: 13/622,247

(22) Filed: Sep. 18, 2012

(51) Int. Cl.
*G06F 15/16* (2006.01)
*G06F 15/173* (2006.01)

(52) U.S. Cl.
USPC .......................................... 709/203; 709/223

(58) Field of Classification Search
None
See application file for complete search history.

(56) References Cited

U.S. PATENT DOCUMENTS

| | | | |
|---|---|---|---|
| 6,345,307 | B1 | 2/2002 | Booth |
| 6,954,801 | B1 | 10/2005 | Housel |
| 7,020,719 | B1 | 3/2006 | Grove et al. |
| 7,398,325 | B2 | 7/2008 | Weller |
| 2005/0188054 | A1 | 8/2005 | Riihijarvi et al. |
| 2012/0300993 | A1* | 11/2012 | Plamondon ................... 382/124 |

FOREIGN PATENT DOCUMENTS

WO       2011068731 A2    6/2011

OTHER PUBLICATIONS

Internet Protocol Suite; http://wikipedia.org/wiki/Internet_protocol_suite; printed Jun. 12, 2012.
Transmission Control Protocol/Internet Protocol; http://publib.boulder.ibm.com/infocenter/pseries/v5r3/index.jsp?topic=/com.ibm.aix.commadmn/doc/commadmndita/tcpip_intro.htm; printed Jun. 12, 2012.
Data-Compression.com; www.data-compression.com/index.shtml; printed Jun. 12, 2012.
Speedy Web dilivery with HTTP compression; http://www.ibm.com/developerworks/web/library/wa-httpcomp/, printed Jun. 12, 2012.
Harris, T., How File Compression Works; http://computer.howstuffworks.com/file-compression.htm/printable; printed Jun. 12, 2012.
http://www.data-compression.com/index.shtml, Home, printed Jun. 12, 2012.
Effnet AB, White Paper, An introduction to IP header compression, Feb. 2004, www.effnet.com.
The Chromium Products; SPDY: An experimental protocol for a faster web, http://www.chromium.org/spdy/spdy-whitepaper.htm, printed Jun. 22, 2012.
CSS Image Sprites, http://www.w3schools.com/css/css_image_sprites.asp; first time printed Jul. 11, 2012.

\* cited by examiner

*Primary Examiner* — Peling Shaw
(74) *Attorney, Agent, or Firm* — Santangelo Law Offices, P.C.

(57) ABSTRACT

An electronic data storage and transmission system. A plurality of electronic data objects may be associated to a plurality of electronic data indicators, and the associations may be combined. Contextual awareness of a second location may allow generation of streamlined electronic data objects. Electronic spatial data objects may be automatically contiguously combined and compression may be leveraged with combination efficiencies. Combinations of electronic data objects may be threshold limited. Transmission of electronic data may achieve effective compression and effective transmission rates exceeding a benchmark network transmission rate of an electronic data communications network.

30 Claims, 19 Drawing Sheets

| Site | Without | | | | | With | | | | | |
|---|---|---|---|---|---|---|---|---|---|---|---|
| | Up 1st Visit | Up 2nd + Visit | Down 1st Visit | Down 2nd + Visit | Time (ms) | Up 1st Visit | Up 2nd + Visit | Down 1st Visit | Down 2nd + Visit | Time (ms) |
| facebook.com | 2454 | 695 | 127698 | 13306 | 8190 | 3,000 | 500 | 125406 | 8149 | 7787 |
| google.com | 1064 | 500 | 41549 | 30349 | 2014 | 2,500 | 500 | 47117 | 4622 | 1501 |
| youtube.com | 34384 | 19876 | 188301 | 77167 | 3034 | 2,500 | 500 | 76582 | 18477 | 931 |
| yahoo.com | 10597 | 1425 | 333518 | 66945 | 6325 | 3,500 | 500 | 152284 | 35474 | 2940 |
| baidu.com | 1436 | 500 | 27670 | 4,394 | 2486 | 2,500 | 500 | 25225 | 2162 | 2222 |
| wikipedia.org | 10394 | 10394 | 58307 | 58307 | 8863 | 1,500 | 500 | 13124 | 10958 | 1682 |
| twitter.com | 1809 | 500 | 190147 | 14070 | 2391 | 3000 | 500 | 139461 | 9081 | 1760 |
| qq.com | 12986 | 1232 | 436848 | 60519 | 11130 | 1,500 | 500 | 88774 | 32279 | 2677 |
| amazon.com | 5415 | 894 | 246411 | 45992 | 6714 | 3,500 | 500 | 220329 | 19619 | 5483 |
| blogspot.com | 4515 | 1268 | 93389 | 15978 | 2104 | 3,000 | 500 | 102678 | 4316 | 2019 |
| linkedin.com | 2568 | 500 | 158139 | 8542 | 1978 | 3,500 | 500 | 127380 | 6312 | 1604 |
| taobao.com | 16456 | 877 | 993839 | 51327 | 15230 | 1500 | 500 | 114281 | 44738 | 2308 |
| msn.com | 4843 | 690 | 165818 | 43707 | 5453 | 3,000 | 500 | 110097 | 31000 | 3666 |
| bing.com | 500 | 500 | 14616 | 14,613 | 1138 | 1,500 | 500 | 16665 | 3529 | 836 |
| wordpress.com | 3760 | 885 | 513813 | 18694 | 6940 | 2,500 | 500 | 498765 | 6621 | 6568 |
| babylon.com | 4142 | 1464 | 57652 | 28520 | 5452 | 3,500 | 500 | 27447 | 4897 | 2159 |
| ebay.com | 5636 | 1438 | 279271 | 18093 | 60451 | 3,000 | 500 | 228804 | 11767 | 48464 |
| microsoft.com | 10691 | 1848 | 320212 | 35162 | 5483 | 3,500 | 500 | 179534 | 17104 | 2990 |
| tumblr.com | 6595 | 1271 | 1623409 | 34922 | 7779 | 2,500 | 500 | 684313 | 14401 | 3276 |
| pinterest.com | 25332 | 3106 | 1276721 | 58666 | 16150 | 3500 | 500 | 501528 | 18377 | 6204 |
| Total | 165577 | 49863 | 7147328 | 699273 | 179305 | 54500 | 10,000 | 3479794 | 303883 | 107078 |

Output + CSS + Script + Images

Up 1st Visit: With is 67.1% faster

Up 2nd + Visit: With is 78% faster

Down 1st Visit: With is 51.3% faster

Down 2nd + Visit: With is 56.5% faster

Up 1st Visit and Up 2nd + Visit and Down 1st Visit and Down 2nd + Visit: With is 52.3% faster Time: With is 40.3% faster

Fig. 16

| | CSS | | | | | | | | |
|---|---|---|---|---|---|---|---|---|---|
| | Without | | | | With | | | | |
| Site | Up 1st Visit | Up 2nd + Visit | Down 1st Visit | Down 2nd + Visit | Time (ms) | Up 1st Visit | Up 2nd + Visit | Down 1st Visit | Down 2nd + Visit | Time (ms) |
| facebook.com | 1085 | 500 | 70,431 | 12,289 | 3,024 | 1,000 | 500 | 67,127 | 11,952 | 2,890 |
| google.com | 500 | 500 | 30,362 | 30,362 | 1,871 | 1,000 | 500 | 30,859 | 21,853 | 1,643 |
| youtube.com | 872 | 500 | 76,487 | 18,933 | 6,762 | 1,000 | 500 | 74,074 | 18,987 | 6,606 |
| yahoo.com | 683 | 683 | 64,020 | 64,020 | 5,813 | 1,000 | 500 | 65,124 | 60,878 | 5,727 |
| baidu.com | 500 | 500 | 4,394 | 4,994 | 1,848 | 1000 | 500 | 5,121 | 3,553 | 1,921 |
| wikipedia.org | 694 | 694 | 12,647 | 12,647 | 9,542 | 1000 | 500 | 12,148 | 10,958 | 8,800 |
| twitter.com | 874 | 500 | 81,758 | 14,486 | 3,506 | 1000 | 500 | 68,740 | 14,672 | 3,050 |
| qq.com | 500 | 500 | 58,447 | 58,447 | 6,985 | 1000 | 500 | 53,461 | 45,823 | 5,971 |
| amazon.com | 894 | 500 | 55,186 | 45,147 | 3,903 | 1000 | 500 | 49,967 | 35,190 | 3,325 |
| blogspot.com | 500 | 500 | 12,803 | 12,803 | 4,253 | 1000 | 500 | 13,688 | 7,151 | 3,571 |
| linkedin.com | 688 | 500 | 14,873 | 8,529 | 2,799 | 1000 | 500 | 14,449 | 8,399 | 2,771 |
| taobao.com | 684 | 500 | 55,017 | 49,285 | 17,480 | 1000 | 500 | 54,584 | 48,042 | 17,255 |
| msn.com | 500 | 500 | 43,705 | 43,705 | 6,639 | 1000 | 500 | 35,439 | 34,902 | 5,395 |
| bing.com | 500 | 500 | 14,621 | 14,621 | 1,008 | 1000 | 500 | 15,466 | 12,466 | 981 |
| wordpress.com | 883 | 500 | 24,554 | 10,124 | 6,005 | 1000 | 500 | 23,445 | 9,659 | 5,762 |
| babylon.com | 880 | 500 | 10,665 | 5,594 | 4,910 | 1000 | 500 | 9,294 | 5,385 | 4,504 |
| ebay.com | 878 | 500 | 35,163 | 14,856 | 60,515 | 1000 | 500 | 31,351 | 12,958 | 53,936 |
| microsoft.com | 886 | 500 | 36,306 | 28,700 | 5,203 | 1000 | 500 | 24,334 | 19,722 | 3,570 |
| tumblr.com | 1,094 | 500 | 51,550 | 13,885 | 7,846 | 1000 | 500 | 13,543 | 13,543 | 3,346 |
| pinterest.com | 500 | 500 | 18,079 | 18,079 | 26,116 | 1000 | 500 | 18,859 | 18,359 | 27,212 |
| Total | 14,595 | 10,377 | 771,068 | 480,906 | 186,028 | 20,000 | 10,000 | 681,073 | 414,452 | 168,237 |

Up 1st Visit: With is 37% slower

Up 2nd + Visit: With is 3.6% faster

Down 1st Visit: With is 11.7% faster

Down 2nd + Visit: With is 13.8% faster

Up 1st Visit and Up 2nd + Visit and Down 1st Visit and Down 2nd + Visit: With is 35.5% faster Time: With is 9.6% faster

Fig. 17

| Site | Script | | | | | | | | |
|---|---|---|---|---|---|---|---|---|---|
| | Without | | | | With | | | | |
| | Up 1st Visit | Up 2nd + Visit | Down 1st Visit | Down 2nd + Visit | Time (ms) | Up 1st Visit | Up 2nd + Visit | Down 1st Visit | Down 2nd + Visit | Time (ms) |
| facebook.com | 695 | 500 | 34,566 | 12,306 | 2,800 | 1,000 | 500 | 34,295 | 7,958 | 2,549 |
| google.com | 500 | 500 | 30,327 | 30,327 | 1,362 | 1,000 | 500 | 31,885 | 14,163 | 1,050 |
| youtube.com | 880 | 880 | 20,407 | 20,407 | 5,597 | 1,000 | 500 | 19,900 | 16,010 | 4,918 |
| yahoo.com | 1,049 | 500 | 89,483 | 63,273 | 5,235 | 1,000 | 500 | 90,013 | 36,259 | 4,335 |
| baidu.com | 1,064 | 688 | 18,794 | 4,394 | 4,956 | 1,000 | 500 | 16,603 | 3,031 | 4,200 |
| wikipedia.org | 694 | 694 | 12,647 | 12,647 | 11,556 | 1,000 | 500 | 12,582 | 11,606 | 11,125 |
| twitter.com | 500 | 500 | 14,483 | 14,483 | 4,392 | 1,000 | 500 | 15,701 | 4,734 | 3,215 |
| qq.com | 1,235 | 500 | 112,443 | 58,521 | 4,473 | 1,000 | 500 | 86,607 | 37,758 | 3,260 |
| amazon.com | 697 | 500 | 98,163 | 45,204 | 3,924 | 1,000 | 500 | 98,093 | 25,420 | 3,393 |
| blogspot.com | 884 | 884 | 14,391 | 14,391 | 4,563 | 1,000 | 500 | 14,362 | 9,684 | 3,816 |
| linkedin.com | 1,064 | 500 | 51,935 | 8,541 | 2,025 | 1,000 | 500 | 50,303 | 5,546 | 1,872 |
| taobao.com | 1,420 | 868 | 110,361 | 49,285 | 13,428 | 1,000 | 500 | 106,542 | 44,133 | 12,619 |
| msn.com | 500 | 500 | 43,985 | 43,985 | 5,152 | 1,000 | 500 | 35,692 | 21,878 | 3,421 |
| bing.com | 500 | 500 | 14,618 | 14,618 | 940 | 1,000 | 500 | 16,080 | 5,946 | 731 |
| wordpress.com | 2,213 | 885 | 75,683 | 18,568 | 5,436 | 1,000 | 500 | 70,049 | 7,196 | 4,397 |
| babylon.com | 2,418 | 1,075 | 54,973 | 14,595 | 4,162 | 1,000 | 500 | 42,955 | 4,593 | 2,794 |
| ebay.com | 1,067 | 500 | 112,664 | 14,991 | 60,447 | 1,000 | 500 | 110,690 | 11,507 | 57,863 |
| microsoft.com | 2,233 | 694 | 135,154 | 29,737 | 5,321 | 1,000 | 500 | 98,089 | 15,647 | 3,654 |
| tumblr.com | 1,475 | 688 | 96,548 | 31,709 | 7,846 | 1,000 | 500 | 95,011 | 12,027 | 6,530 |
| pinterest.com | 896 | 694 | 131,594 | 19,030 | 13,056 | 1,000 | 500 | 132,031 | 17,486 | 12,953 |
| Total | 21,984 | 13,050 | 1,273,219 | 521,012 | 166,671 | 20,000 | 10,000 | 1,177,483 | 312,582 | 148,694 |

Up 1st Visit: With is 9% faster

Up 2nd + Visit: With is 23.4% faster

Down 1st Visit: With is 7.8% faster

Down 2nd + Visit: With is 40% faster

Up 1st Visit and Up 2nd + Visit and Down 1st Visit and Down 2nd + Visit: With is 16.9% faster Time: With is 10.8% faster

Fig. 18

| Site | Up 1st Visit | Up 2nd + Visit | Without Down 1st Visit | Down 2nd + Visit | Time (ms) | Up 1st Visit | Up 2nd + Visit | With Down 1st Visit | Down 2nd + Visit | Time (ms) |
|---|---|---|---|---|---|---|---|---|---|---|
| facebook.com | 1,876 | 897 | 27,848 | 14,533 | 3,679 | 2,000 | 500 | 19,915 | 11,895 | 2,795 |
| google.com | 1,064 | 500 | 41,698 | 30,498 | 1,437 | 1,500 | 500 | 45,999 | 31,077 | 1,541 |
| youtube.com | 33,074 | 20,054 | 127,083 | 77,733 | 6,890 | 1,500 | 500 | 22,214 | 21,036 | 1,209 |
| yahoo.com | 10,045 | 1,056 | 329,625 | 65,209 | 5,213 | 2,500 | 500 | 142,359 | 66,392 | 2,719 |
| baidu.com | 872 | 500 | 8,113 | 4,394 | 1,777 | 1,500 | 500 | 8,693 | 4,730 | 1,975 |
| wikipedia.org | 10,200 | 10,200 | 58,053 | 58,053 | 2,909 | 500 | 500 | 11,593 | 11,593 | 515 |
| twitter.com | 687 | 500 | 103,885 | 14,605 | 2,869 | 1,500 | 500 | 77,087 | 15,011 | 2,256 |
| qq.com | 12,255 | 1,052 | 365,481 | 59,665 | 5,198 | 500 | 500 | 54,088 | 54,088 | 1,294 |
| amazon.com | 5,019 | 500 | 202,430 | 45,916 | 5,852 | 2,500 | 500 | 166,970 | 45,244 | 4,961 |
| blogspot.com | 3,939 | 692 | 91,007 | 13,596 | 5,109 | 2,000 | 500 | 101,188 | 14,056 | 5,507 |
| linkedin.com | 1,628 | 500 | 99,929 | 7,850 | 2,265 | 2,500 | 500 | 72,271 | 8,354 | 1,723 |
| taobao.com | 18,054 | 1,272 | 993,378 | 51,881 | 17,823 | 2,500 | 500 | 1,270,329 | 51,677 | 22,183 |
| msn.com | 4,653 | 500 | 167,754 | 50,208 | 7,832 | 2,000 | 500 | 110,981 | 40,082 | 5,391 |
| bing.com | 500 | 500 | 14,614 | 14,614 | 944 | 500 | 500 | 14,928 | 14,928 | 964 |
| wordpress.com | 1,664 | 500 | 433,962 | 10,270 | 8,855 | 1,500 | 500 | 425,476 | 10,562 | 8,689 |
| babylon.com | 891 | 692 | 7,928 | 6,657 | 4,028 | 1,500 | 500 | 6,803 | 5,628 | 3,595 |
| ebay.com | 4,308 | 1,438 | 90,943 | 24,403 | 60,558 | 2,000 | 500 | 61,871 | 15,676 | 40,031 |
| microsoft.com | 8,954 | 1,652 | 178,305 | 33,695 | 6,448 | 2,500 | 500 | 112,265 | 21,428 | 3,959 |
| tumblr.com | 4,444 | 697 | 1,421,313 | 14,841 | 9,866 | 2,000 | 500 | 775,283 | 15,189 | 5,428 |
| pinterest.com | 25,787 | 1,910 | 1,406,040 | 33,630 | 13,722 | 2,500 | 500 | 533,818 | 21,209 | 5,218 |
| Total | 149,914 | 45,612 | 6,169,389 | 632,251 | 173,274 | 35,500 | 10,000 | 4,034,131 | 479,855 | 121,954 |

Up 1st Visit: With is 76.3% faster

Up 2nd + Visit: With is 78.1% faster

Down 1st Visit: With is 34.6% faster

Down 2nd + Visit: With is 24.1% faster

Up 1st Visit and Up 2nd + Visit and Down 1st Visit and Down 2nd + Visit: With is 34.8% faster Time: With is 29.6% faster

Fig. 19

METHODS AND APPARATUS FOR INCREASING THE EFFICIENCY OF ELECTRONIC DATA STORAGE AND TRANSMISSION

BACKGROUND

The present inventive technology relates to the field of electronic data storage and transmission. The present inventive technology may be used more particularly, but not exclusively, to supplement or replace conventional electronic data compression technologies to achieve improved efficiencies in such electronic data storage and transmission.

Compression technologies are widely employed in the field of electronic data storage and transmission to increase the efficiencies of such storage and transmission. The benefits of compression are well known, and many conventional approaches to the compression of electronic data exist. However, compression technologies may fail to address some of the principal causes of inefficiencies in electronic data storage and transmission.

For example, electronic data may tend to exist in a widely dispersed nature. In an electronic communications network, electronic data may exist at different nodes or termini of the network. On a computing device, electronic data may be stored in disparate locations in computer memory. In one conventional technology, a client may be required to make multiple requests of a server to load a World Wide Web page, in as much as the electronic data required by the client to load the page may be located at disparate locations on the server. For example, a client typically may require multiple CSS, script, and image files from the server to load the page. If these files are located at different locations on the server, as typically may be the case, the client may be required to make a separate request for every separate location at which the necessary electronic data may be found, leading to inefficiencies that conventional compression technologies do not address.

In addition, compression technologies often may modify the conventional infrastructure of modern electronic data storage and transmission technologies. For example, compression technologies may often act to alter basic infrastructure elements such as the TCP, IP, or HTTP layers of Internet and World Wide Web electronic data transmission. Implementing these alterations may require an expenditure of resources, such as perhaps the time and costs associated with developing, installing, and maintaining the software and hardware elements, and it may be inherently undesirable to alter the underlying infrastructure of electronic data storage and transmission. Conventional compression technologies accordingly may not be well suited to utilizing such conventional infrastructure it its most efficient manner.

Compression technologies also may not take full advantage of electronic automation. For example, certain kinds of electronic data amalgamation, such as the creation of image sprites or the limiting of the accumulation of dynamically generated content on World Wide Web pages, may conventionally have required significant human action, implementation, or supervision.

It also may be the case that compression technologies may not conventionally be leveraged to their fullest effect. For example, image compression schemes such as JPG, GIF, or PNG may only act to compress an individual image file, and may not be leveraged to take advantage of additional compression possibilities across multiple compressed image files.

In addition, compression technologies may be context unaware. For example, in compressing electronic data to improve the efficiency of transmission, conventional compression may only be able to compress such data in its entirety or not at all, and may not be able to distinguish those portions of the electronic data having an actual use at the receiving end from those portions of the electronic data that may go unused at the receiving end.

The foregoing problems related to conventional compression technologies may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTION

In one embodiment, an object of the inventive technology is to provide a method for consolidating input/output of electronic data transmission comprising the steps of: storing multiple electronic data objects at a first location; storing multiple electronic data indicators at a second location; linking said first location and said second location with an input/output pathway; associating a plurality of said multiple electronic data objects at said first location to a plurality of said multiple electronic data indicators at said second location through said input/output pathway to create multiple electronic data associations; consolidating at least some of said multiple electronic data associations into a single consolidated electronic data association; and transmitting electronic data through said input/output pathway utilizing said single consolidated electronic data association.

In another embodiment, an object of the inventive technology is to provide an input/output electronic data transmission consolidation apparatus comprising: a first electronic storage medium having multiple electronic data objects stored thereon; a second electronic storage medium having multiple electronic data indicators stored thereon; an input/output pathway linking said first electronic storage medium and said second electronic storage medium; an electronic data associator to which said first electronic storage medium having multiple electronic data objects stored thereon, said second electronic storage medium having multiple electronic data indicators stored thereon, and said input/output pathway linking said first electronic storage medium and said second electronic storage medium are responsive; an electronic data consolidator responsive to said electronic data associator and to which said input/output pathway linking said first electronic storage medium and said second electronic storage medium is responsive; and an electronic data transmitter responsive to said electronic data consolidator and to which said input/output pathway linking said first electronic storage medium and said second electronic storage medium is responsive.

In another embodiment, an object of the inventive technology is to provide a method for effectively compressing electronic data transmission comprising the steps of: storing multiple electronic data objects at a first location; storing multiple electronic data indicators at a second location; combining said multiple electronic data objects into a single combined electronic data object at said first location; combining said multiple electronic data indicators into a single combined electronic data indicator at said second location; associating said single combined electronic data object at said first location to said single combined electronic data indicator at said second location; effectively compressing at least one request from said second location for at least one said electronic data object at said first location with said single combined electronic data indicator at said second location; and effectively compressing provision from said first location of at least one said electronic data object to said second location with said single combined electronic data object at said first location.

In another embodiment, an object of the inventive technology is to provide an electronic data transmission effective compression apparatus comprising: a first electronic storage medium having multiple electronic data objects stored thereon; a second electronic storage medium having multiple electronic data indicators stored thereon; an electronic data object combiner to which said first electronic storage medium having multiple electronic data objects stored thereon is responsive; an electronic data indicator combiner to which said second electronic storage medium having multiple electronic data indicators stored thereon is responsive; an electronic data associator responsive to said electronic data object combiner and said electronic data indicator combiner; and an electronic data object request and provide effective compressor responsive to said electronic data associator and to which said first electronic storage medium having multiple electronic data objects stored thereon and said second electronic storage medium having multiple electronic data indicators stored thereon are responsive.

In another embodiment, an object of the inventive technology is to provide a method for increasing the effective rate of transmitting electronic data comprising the steps of: storing an electronic data object at a first location; linking said first location to a second location via an electronic data communications network; accessing said electronic data communications network utilizing an electronic message assembly protocol and an electronic message addressing protocol; having a benchmark network transmission rate for electronic data transmission via said electronic data communications network utilizing said electronic message assembly protocol and said electronic message addressing protocol; transmitting said electronic data object from said first location to said second location via said electronic data communications network at an effective network transmission rate greater than said benchmark network transmission rate.

In another embodiment, an object of the inventive technology is to provide an electronic data transmission effective rate augmentation apparatus comprising: a first electronic storage medium having an electronic data object stored thereon; an electronic data communications network linking said first electronic storage medium to a second electronic storage medium; an access point to said electronic data communications network responsive to an electronic message assembly protocol and an electronic message addressing protocol; a benchmark network transmission rate of said electronic data communications network responsive to said electronic message assembly protocol and said electronic message addressing protocol; an electronic data object transmission effective rate augmenter responsive to said benchmark network transmission rate and to which said first electronic storage medium having an electronic data object stored thereon, said second electronic storage medium, and said electronic data communications network linking said first electronic storage medium to said second electronic storage medium are responsive.

In another embodiment, an object of the inventive technology is to provide a method for combining electronic spatial data comprising the steps of: automatically accessing multiple electronic spatial data objects; automatically identifying at least one characteristic of each said electronic spatial data object relevant to contiguous combination of said multiple electronic spatial data objects; automatically aggregating said multiple electronic spatial data objects having said at least one automatically identified characteristic relevant to said contiguous combination of said multiple electronic spatial data objects; automatically contiguously combining said multiple electronic spatial data objects using each said automatically identified characteristic; creating a single contiguously combined electronic spatial data object.

In another embodiment, an object of the inventive technology is to provide an electronic spatial data combination apparatus comprising: multiple electronic spatial data objects stored on at least one electronic storage medium; an automated electronic spatial data object accessor responsive to said multiple electronic spatial data objects; an automated contiguous combination characteristic identifier responsive to said automated electronic spatial data object accessor; an automated electronic spatial data object aggregator responsive to said automated contiguous combination characteristic identifier; an automated electronic spatial data object contiguous combiner responsive to said automated electronic spatial data object aggregator; an automated single contiguously combined electronic spatial data object creator responsive to said automated electronic spatial data object contiguous combiner.

In another embodiment, an object of the inventive technology is to provide a method for threshold combining electronic data comprising the steps of: automatically accessing multiple electronic data objects; automatically identifying at least one characteristic of each said electronic data object relevant to a threshold criterion for combining said multiple electronic data objects; automatically aggregating said multiple electronic data objects having said at least one automatically identified characteristic relevant to said threshold criterion for combining said multiple electronic data objects; automatically determining if said threshold criterion for combining said multiple electronic data objects has been satisfied; automatically combining said multiple electronic data objects in accordance with said automatic determination if said threshold criterion for combining said multiple electronic data objects has been satisfied.

In another embodiment, an object of the inventive technology is to provide an electronic data threshold combination apparatus comprising: multiple electronic data objects stored on at least one electronic storage medium; an automated electronic data object accessor responsive to said multiple electronic data objects; an automated threshold criterion combination characteristic identifier responsive to said automated electronic data object accessor; an automated electronic data object aggregator responsive to said automated threshold criterion combination characteristic identifier; an automated threshold criterion determiner responsive to said automated electronic data object aggregator; an automated electronic data object combiner responsive to said automated threshold criterion determiner.

In another embodiment, an object of the inventive technology is to provide a method for compressing electronic spatial data comprising the steps of: accessing multiple electronic spatial data objects; aggregating said multiple electronic spatial data objects for combining said multiple electronic spatial data objects; combining said multiple electronic spatial data objects; creating a single combined electronic spatial data object; electronically compressing said single combined electronic spatial data object to create an electronically compressed combined electronic spatial data object.

In another embodiment, an object of the inventive technology is to provide an electronic spatial data compression apparatus comprising: multiple electronic spatial data objects stored on at least one electronic storage medium; an electronic spatial data object accessor responsive to said multiple electronic spatial data objects; an electronic spatial data object aggregator responsive to said electronic spatial data object accessor; an electronic spatial data object combiner responsive to said electronic spatial data object aggregator; a single combined electronic spatial data object creator responsive to said electronic spatial data object combiner; a combined electronic spatial data object electronic compressor responsive to said single combined electronic spatial data object creator.

In another embodiment, an object of the inventive technology is to provide a method for transmitting streamlined electronic data comprising the steps of: storing an electronic data object at a first location; automatically recognizing a use for said electronic data object at a second location; automatically determining constituent parts of said electronic data object necessary for said use at said second location and constituent parts of said electronic data object unnecessary for said use at said second location; automatically selectively removing said constituent parts of said electronic data object unnecessary for said use at said second location to create a streamlined electronic data object; electronically transmitting said streamlined electronic data object from said first location to said second location.

In another embodiment, an object of the inventive technology is to provide a streamlined electronic data transmission apparatus comprising: a first electronic storage medium having an electronic data object stored thereon; an automated second location electronic data object use recognizer responsive to said electronic data object; an automated electronic data object second location use constituent part determiner responsive to said automated second location electronic data object use recognizer; an automated electronic data object second location dispensable constituent part determiner responsive to said automated second location electronic data object use recognizer; an automated streamlined electronic data object creator responsive to said automated electronic data object second location use constituent part determiner and said automated electronic data object second location dispensable constituent part determiner; an automated streamlined electronic data object transmitter responsive to said automated streamlined electronic data object creator.

Naturally, further objects of the inventive technology will become apparent from the description and drawings below.

BRIEF DESCRIPTION OF THE DRAWINGS

FIG. 16 is a table presenting effective compression data for electronic data comprising CSS data, script data, and image data in one exemplary embodiment.

FIG. 17 is a table presenting effective compression data for electronic data comprising CSS data in one exemplary embodiment.

FIG. 18 is a table presenting effective compression data for electronic data comprising script data in one exemplary embodiment.

FIG. 19 is a table presenting effective compression data for electronic data comprising image data in one exemplary embodiment.

DETAILED DESCRIPTION OF THE PREFERRED EMBODIMENTS

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the inventive technology may utilize one or more electronic data objects. Electronic data objects may be understood to include electronic entities that can be manipulated by the commands of a programming language, such as a value, variable, function, data element, or data structure. An electronic data object also may comprise programming code, such HTML or other kinds of programming code. Examples of electronic data objects may include files, Web pages, scripts, CSS, or image information. A file generally may be understood to include a collection of related electronic data or programming code stored on an electronic storage medium.

Various embodiments of the inventive technology also may utilize one or more electronic data indicators. Electronic data indicators may be understood to include electronic entities that can indicate location information for an electronic data object. For example, an electronic data indicator may have address information for one or more electronic data objects, such as an address to a location in electronic memory, an address to a location on an electronic communications network, or the like.

An example of an electronic data indicator in one embodiment may be a pointer on a Web page. For example, in conventional World Wide Web architecture, a client may request information from a server to load a Web page. The server may respond with information for the Web page, wherein the information may include one or more pointers for the client to follow in order to retrieve information for the Web page. In some examples, the pointers may direct the client to obtain CSS information, script information, image information, or other kinds of information necessary for the Web page, wherein such information may be stored elsewhere.

Figure 1:
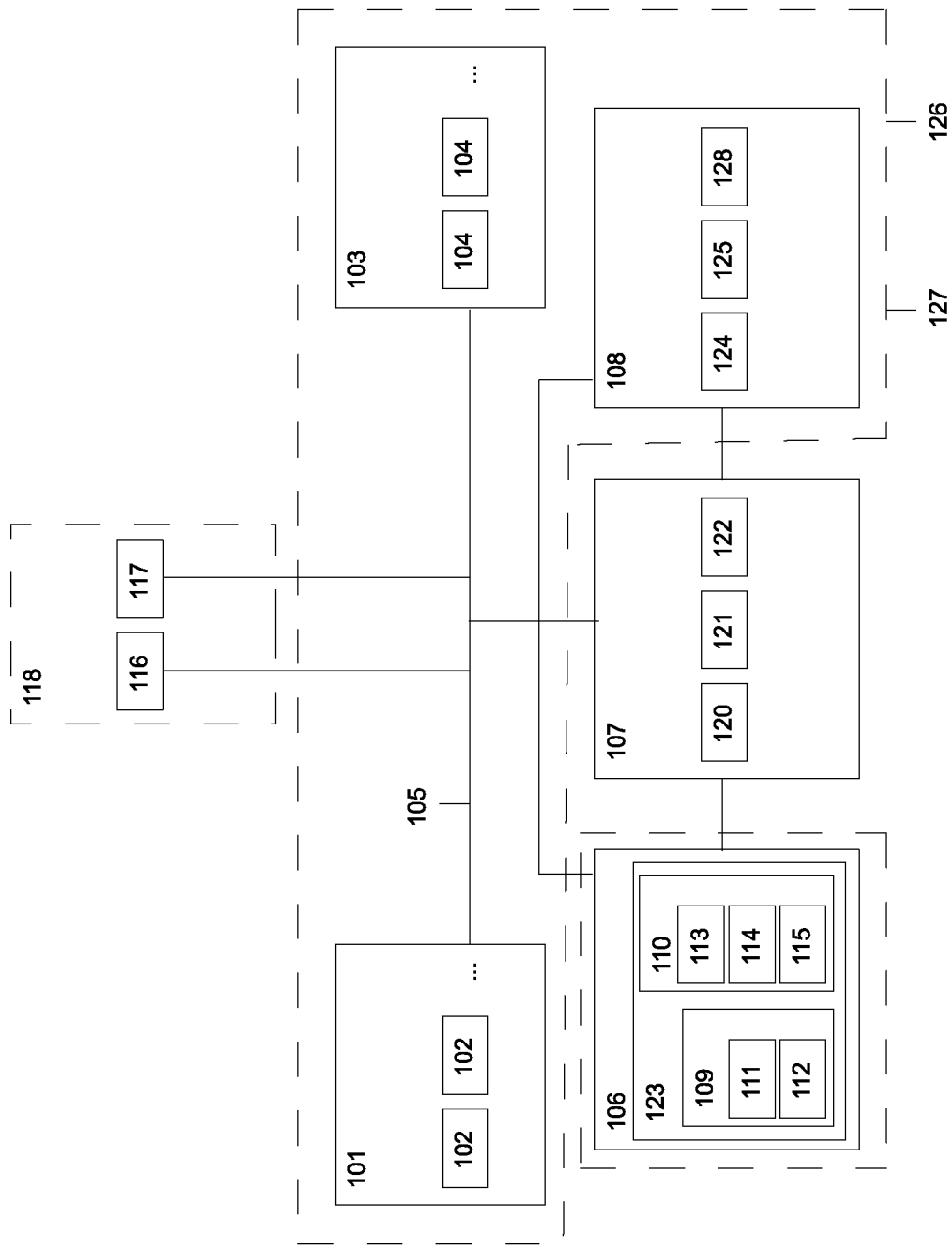
FIG. 1 is a schematic representation of an input/output electronic data transmission consolidation apparatus in one exemplary embodiment.

Now with reference primarily to FIG. 1, embodiments of the inventive technology may involve a method for consolidating input/output of electronic data transmission and an input/output electronic data transmission apparatus.

The method may involve storing multiple electronic data objects (102) at a first location, such as with a first electronic storage medium (101), and storing multiple electronic data indicators (104) at a second location, such as a second electronic storage medium (103).

As used herein throughout, such locations may be any suitable locations at which electronic data may be stored. Examples of such locations may be network nodes or locations within a computing device, such as computer memory. In some embodiments, a first location may be a server and a second location may be a client. Embodiments also may involve one or more such locations being a mobile computing device.

The inventive technology may involve linking the first location and the second location with an input/output pathway (105). Such an input/output pathway (105) may allow electronic data to be moved relative to the first location and the second location, such as by movements including in-and-out, two-way, back-and-forth, send-and-receive, and the like. Naturally, input/output may involve either input, output, or both.

In some embodiments, an input/output pathway (105) may be an electronic communications network. Such networks may allow transmission of electronic data from at least one location to at least another location, and may include wired or wireless, analog or digital, and hardware and software elements. Examples of electronic communications networks may include the Internet and the World Wide Web, but also may include, for example, internal buses or other architectures within an individual computing device.

The inventive technology may involve associating a plurality of multiple electronic data objects (102) at a first location to a plurality of said multiple electronic data indicators (104) at a second location through an input/output pathway (105) to create multiple electronic data associations. Such electronic data associations may serve to connect or otherwise bring into relation such electronic data objects (102) and electronic data indicators (104). For example, one kind of electronic data association may be a pointer at a client pointing to a file, such as a CSS, script, or image file, at a server. Embodiments may involve one-to-one electronic data associations, such as one pointer pointing to one such file, or perhaps more generally such as creating at least one counterpart electronic data object (102) and electronic data indicator (103). Accordingly, embodiments may include an electronic data associator (106) to which said first electronic storage medium (101), said second electronic storage medium (103), and said input/output pathway (105) are responsive, and perhaps may include an electronic data object and electronic data indicator counterpart architecture (119).

In some embodiments, associating may involve creating mutually interdependent functionality among a plurality of multiple electronic data objects (102) at a first location and a plurality of a multiple electronic data indicators (104) at a second location. In this kind of arrangement, the object and the indicator may each be necessary for creating the functional utility of the association by being mutually interdependent on one another. Accordingly, embodiments may involve a mutually interdependent functionality architecture (123).

For example, creating a mutually interdependent functionality may involve addressing at least one electronic data indicator (104) at a second location (103) to at least one electronic data object (102) at a first location (101) and delivering the electronic data object (102) from the first location (101). In the case of a pointer at a client pointing to a file, such as a CSS, script, or image file, at a server, the functional utility of the association may derive from the relationship between the pointer pointing to a file and the file being pointed, such as to allow a client to follow the pointer to access the file, and a server to deliver the file to the client. Accordingly, embodiments may include an electronic data indicator address processor (109) and an electronic data object delivery processor (110).

In some embodiments, addressing may involve generating a character sequence that uniquely identifies an electronic data object (102) and using the character sequence to address the electronic data indicator (103) to the electronic data object (102). Accordingly, embodiment may involve using a unique character sequence identification generator (111) responsive to an electronic data object (102) and an electronic data indicator addresser (112) responsive to the unique character sequence identification generator (111). Delivering the electronic data object (102) may involve recognizing the character sequence used to address the electronic data indicator (104) to the electronic data object (102), and may involve retrieving the electronic data object (102) related to the character sequence and delivering the electronic data object (102), such as from a server to a client. Accordingly, embodiments may involve a unique character sequence identification recognizer (113) responsive to an addressed electronic data indicator (104), a unique character sequence identification retriever (114) responsive to the unique character sequence identification recognizer (113), and an electronic data object delivery system (115).

Moreover, the inventive technology may involve requesting an electronic data object (102) using the character sequence in an initial request and avoiding repeating requests for the electronic data object (102) using the character sequence in subsequent requests. Accordingly, embodiments may include an electronic data object character sequence initial request processor (116) and an electronic data object subsequent repeated request avoidance processor (117). This may serve, for example, to reduce the number of requests or eliminate repeated requests for the electronic data object, such as by client to a server, even if the character sequence is presented in subsequent requests. Using the character sequence in an initial request and avoiding repeating requests may be accomplished, for example, by providing appropriate instruction from one location to another location, such as from a server to a client, perhaps in a server response to an initial request from a client, and wherein the character sequence may be utilized to facilitate such instruction. Accordingly, embodiments may include a one location instruction architecture (118).

The inventive technology may involve consolidating at least some multiple electronic data associations into a single consolidated electronic data association. Consolidating should be understood to include reducing multiple instances of electronic data associations into fewer instances of electronic data associations, in some cases perhaps even reducing to one single consolidated data association. Accordingly, embodiments may include an electronic data consolidator (107) responsive to an electronic data associator (106) and to which an input/output pathway (105) are responsive.

For example, in some embodiments consolidating may involve combining at least some multiple electronic data associations into a single consolidated electronic data association. Accordingly, embodiments may include an electronic data combiner (120).

In another example, consolidating may involve reducing the number of locations of electronic data objects (102) and electronic data indicators (102). Electronic data objects (102) stored at different locations may be consolidated into storage at one location, and electronic data indicators (104) formerly indicating different locations may be consolidated into fewer indicators corresponding to the common location of formerly disparate object locations. In this manner, wherein disparately located electronic data objects (102) formerly may have required multiple electronic data associations to accommodate the disparate locations, the act reducing the number of locations of electronic data objects (102) and electronic data indicators (104) may result in consolidating the number of multiple electronic data associations. Accordingly, embodiments may involve an electronic data object location number reduction system and an electronic data indicator location number reduction system.

More particularly, in some embodiments, consolidating may involve reducing the number of locations of css information, script information, and image information, such that such css information may be consolidated at one location, such script information may be consolidated at one location, and such image information may be consolidated at one location. In this manner, wherein multiple css, script, and image pointers may have been required before consolidation, only a single css, script, and image pointer may be required after consolidation, again perhaps demonstrating how multiple css, script, and image associations can be consolidated into fewer or even single css, script, image associations.

Of course, such acts of consolidation may involve reducing the number of access events of multiple electronic data associations and may involve reducing the time to access electronic data objects (102). Access events may be understood to involve the steps required in any individual association to utilize the associated functionality, such as by following a pointer to an object and retrieving the object. Accordingly, embodiments may involve a multiple electronic data association access event reduction system (121). Naturally, wherein associations are consolidated, the number of access events required and the time associated to implement them may be reduced. Accordingly, embodiments may include an electronic data object access time reduction system and an electronic data indicator access time reduction system.

The inventive technology may involve retaining a separately usable functionality of each individual electronic data association. This is to say that notwithstanding any act of consolidation, the preexisting functionality of any individual association may be preserved. For example, wherein consolidating may involve creating consolidated associations for CSS, script, or image information, the consolidated association still may be usable and may permit any individual css, script, or image information to be accessed and utilized from within the consolidated CSS, script, or image information. Accordingly, embodiments may involve an individual electronic data association separate use functionality retention processor (122).

Naturally, consolidating multiple electronic data associations into a single consolidated electronic data association may reduce the size of such data associations. Embodiments may involve consolidating at least some of said multiple electronic data associations into a single consolidated electronic data association having a size of up to 52.3% less than the size of said unconsolidated multiple electronic data associations, consolidating CSS data associations into a single consolidated CSS data association having a size of up to 35.5% less than the size of unconsolidated multiple CSS data associations, consolidating multiple script data associations into a single consolidated script data association having a size of up to 16.9% less than the size of unconsolidated multiple script data associations, and consolidating multiple image data associations into a single consolidated image data association having a size of up to 34.8% less than the size of unconsolidated multiple image data associations. Accordingly, embodiments may include an up to 52.3% consolidation electronic data consolidator, an up to 35.5% consolidation CSS data consolidator, an up to 16.9% consolidation script data consolidator, and an up to 34.8% image data consolidator.

The inventive technology may involve transmitting electronic data through the input/output pathway (105) utilizing a single consolidated electronic data association. For example, the functionality created by the association may form the basis of transmitting an electronic data object (102) using an electronic data indicator (104) from one location to another, such as where a CSS file, script file, or image file may be transmitted from a server to client based on the relationship of a pointer at the client to the location of the file on the server. Accordingly, embodiments may involve an electronic data transmitter (108) responsive to an electronic data consolidator (107) and to which an input/output pathway (105) may be responsive.

In some embodiments, transmitting may involve selectively transmitting. In such cases, an electronic data transmitter (108) may be a selective electronic data transmitter. For example, while a single consolidated electronic data association may have information related to multiple electronic data objects (102) and multiple electronic data indicators (102), transmitting may involve using the single consolidated electronic data association to transmit perhaps fewer than all of such objects using perhaps fewer than all of such indicators. In some embodiments, selectively transmitting may involve separately transmitting one electronic data object (102) using one electronic data indicator (104) of a single consolidated electronic data association, while other embodiments may involve transmitting multiple electronic data objects (102) using multiple electronic data indicators (104) of a single consolidated electronic data association. In this manner, selectively transmitting may involve transmitting a single CSS object, script object, or image object using a single pointer, even wherein multiple CSS objects, script objects, or image objects may have been consolidated with multiple pointers into a single consolidated electronic data association.

Accordingly, embodiments may involve a separate electronic data object and separate electronic data indicator transmission architecture (124), a transmission architecture (125) responsive to an electronic data consolidator (107), and a multiple electronic data object and multiple electronic data indicator transmission architecture (126) responsive to an electronic data consolidator (107).

The act of selectively transmitting may be effected in various embodiments by utilizing HTTP headers, such as wherein the information of a single consolidated electronic data association may be carried by HTTP headers in request and response communications between a server and a client. For example, the consolidated electronic data association information carried by an HTTP header may be used to select electronic data. Accordingly, embodiments may include an HTTP header electronic data selection processor responsive to an electronic data consolidator (107).

Transmitting electronic data in various embodiments also may involve transmitting via one electronic data exchange transaction. For example, without the consolidation of multiple electronic data associations as described herein, multiple electronic data exchange transactions may be required to make use of electronic data objects (104) stored at different locations. Via consolidation, a single electronic data exchanged transaction may suffice to make use of such multiple electronic data objects (104), such as wherein a single consolidated electronic data association may allow one pointer to access multiple CSS files, script files, or image files. In this manner, embodiments may involve transmitting multiple electronic data objects (102) using multiple electronic data indicators (104) and avoiding multiple electronic data exchange transactions. Accordingly, embodiments may involve a single electronic data exchange transaction system and a multiple electronic data exchange transaction avoidance system (127) to which said multiple electronic data objects (102) and said multiple electronic data indicators (104) are responsive.

Of course, transmitting electronic data using these consolidation principles may involve transmitting fewer bytes of electronic data. Embodiments may involve transmitting up to 52.3% fewer bytes of electronic data through said input/output pathway utilizing said single consolidated electronic data association as compared to not utilizing said single consolidated electronic data association, transmitting up to 35.5% fewer bytes of CSS data through said input/output pathway utilizing said single consolidated electronic data association as compared to not utilizing said single consolidated electronic data association, transmitting up to 16.9% fewer bytes of script data through said input/output pathway utilizing said single consolidated electronic data association as compared to not utilizing said single consolidated electronic data association, and transmitting up to 34.8% fewer bytes of image data through said input/output pathway utilizing said single consolidated electronic data association as compared to not utilizing said single consolidated electronic data association. Accordingly, embodiments may include an up to 52.3% reduced bytes electronic data transmitter, an up to 35.5% reduced CSS bytes electronic data transmitter, an up to 16.9% reduced script bytes electronic data transmitter, and an up to 34.8% reduced image bytes electronic data transmitter.

Figure 2:
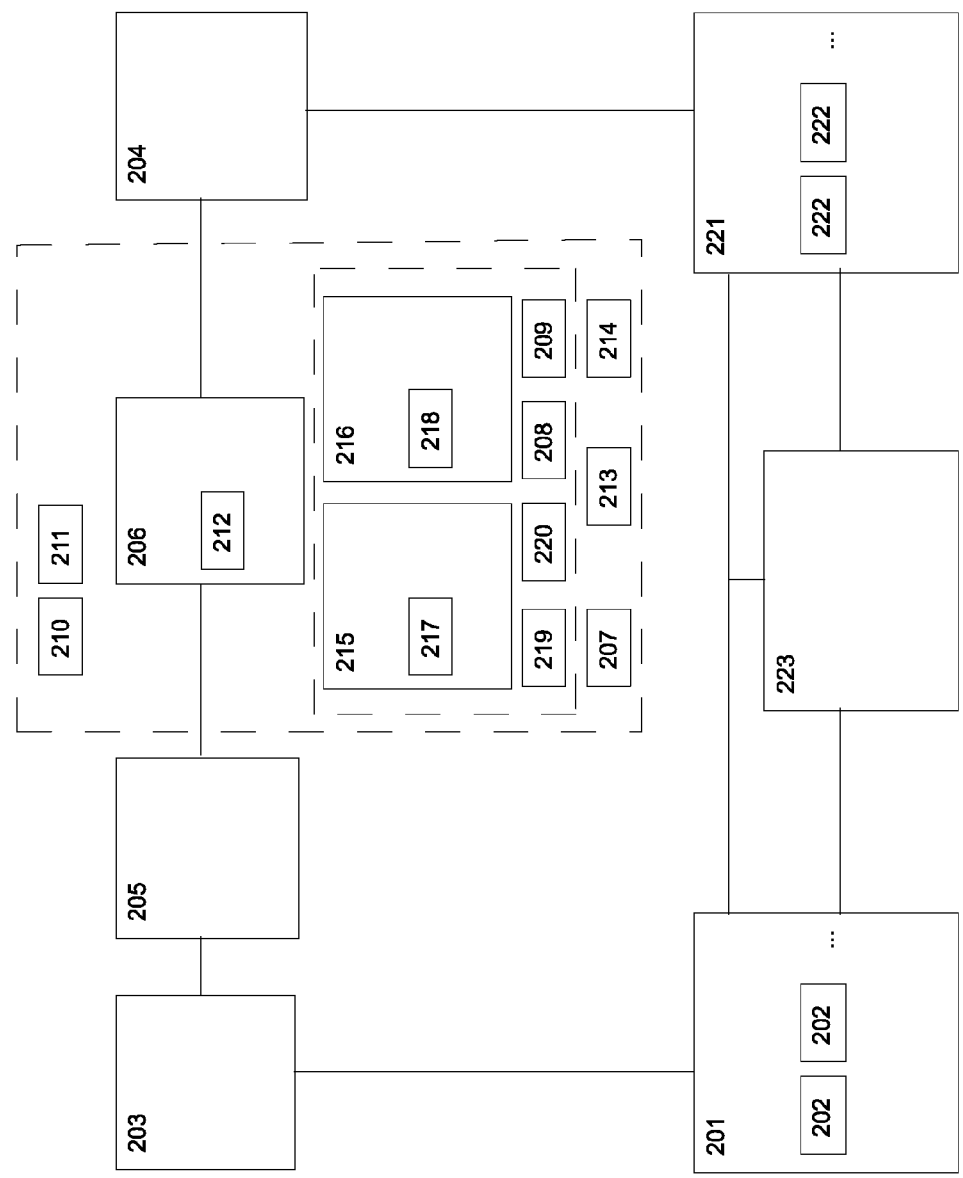
FIG. 2 is a schematic representation of an electronic data transmission effective compression apparatus in one exemplary embodiment.

Now with reference primarily to FIG. 2, embodiments of the inventive technology may involve a method for effectively compressing electronic data transmission and an electronic data transmission effective compression apparatus.

The method may involve storing multiple electronic data objects (202) at a first location, such as on a first electronic storage medium (201), and multiple electronic data indicators (222) at a second location, such as on a second electronic storage medium (221), perhaps as may have been described elsewhere herein. Embodiments also may involve transmitting electronic data from said first location to said second location, such as with an electronic data transmitter (223).

Embodiments may involve combining the multiple electronic data objects (102) into a single combined electronic data object at the first location (101), and combining the multiple electronic data indicators (222) into a single combined electronic indicator at the second location (221). Combining may be understood to involve taking individual objects or indicators and integrating them into a form having at least one unitary element. Examples may include taking multiple CSS files and creating one CSS file having the information of the original multiple CSS files, taking multiple script files and creating one script file having the information of the original multiple script files, taking multiple image files and creating one image file having the information of the original multiple image files, taking multiple pointers and creating one pointer having the information of the original multiple pointers, and the like. Accordingly, embodiments may include an electronic data object combiner (203) to which a first electronic storage medium (201) having multiple electronic data objects (202) stored thereon is responsive and electronic data indicator combiner (204) to which said second electronic storage medium (221) having multiple electronic data indicators (222) stored thereon is responsive.

Moreover, creating one pointer from multiple pointers may involve creating one output having a size of up to 500 bytes less than the size of the multiple pointers. Accordingly, embodiments may include an up to 500 byte reduce output size combiner.

For example, in various embodiments combining may involve creating at least one common characteristic from separate characteristics. As discussed for example above, characteristics may include file type, such as CSS, script, image, or pointer. Other examples of characteristics may include location characteristic, name characteristic, and address characteristic. Accordingly, combiner in various embodiments may be a common characteristic combination processor, a location characteristic combination processor, a name characteristic combination processor, and an address characteristic combination processor.

Any suitable method of combining may be utilized. Embodiments may include sequentially combining, such as wherein individual objects or pointers may be combined in succession, contiguously combining, such as wherein individual objects or pointers may be combined in contact, hierarchically combining, such as wherein individual objects or pointers may be combined in rank, or the like. Accordingly, a combiner in various embodiments may be a sequential combiner, a contiguous combiner, or a hierarchical combiner.

Of course, such acts of combining may act to reduce the size of these kinds of files. In various embodiments, combining may involve creating one CSS file from multiple CSS files including creating one CSS file having a size of up to 35.5% less than the size of said multiple CSS files, creating one script file from multiple script files including creating one script file having a size of up to 16.9% less than the size of said multiple script files, creating one image file from multiple image files including creating one image file having a size of up to 34.8% less than the size of said multiple image files, and creating one pointer from multiple pointers.

Accordingly, a combiner in various embodiments maybe a CSS file combiner, including perhaps an up to 35.5% reduced CSS file size combiner; a script file combiner, including perhaps an up to 16.9% reduced script file size combiner, an image file combiner, including perhaps an up to 34.8% reduce image file size combiner, and a pointer combiner.

Embodiments may involve associating a single combined electronic data object (202) at a first location (201) to a single combined data indicator (222) at a second location (221), perhaps using principles for association as described elsewhere herein. Accordingly, embodiments may involve an electronic data associator (205) responsive to an electronic object combiner (203) and an electronic data indicator combiner (204).

Embodiments may involve effectively compressing at least one request from a second location (221) for at least one electronic data object (102) at a first location (101) with said single combined electronic data indicator at the second location (221) and effectively compressing provision from the first location (101) of the electronic data object (102) to said second location (221) with the single combined electronic data object at said first location (101). Accordingly, embodiments may include an electronic data object request and provide effective compressor (206) responsive to an electronic data associator (205) and to which a first electronic storage medium (201) and a second electronic storage medium (221) are responsive.

This may involve, for example, effectively compressing a request from a client to a server for information on the server necessary to load a Web page at the client, including information such as CSS files, script files, or image data, wherein the client may utilize a combined pointer pointing to a combined CSS file, combined script file, or combined image data file. Effective compression may be achieved, for example, by using a single combined pointer in place of multiple separate pointers to request information, and using a single combined CSS, script, or image file to provide information, rather than using multiple separate CSS, script, or image files.

Effectively compressing may be understood to include achieving compression effects in the handling of electronic data, and may be understood to include doing so without compressing or perhaps without solely compressing. For example, if compression technologies may achieve time, speed, or similar efficiencies in the storage and transmission of electronic data by reducing the size of electronic data; effective compression may involve achieving the same or comparable efficiencies by combining electronic data. Stated differently, in at least some embodiments, effectively compressing may involve the capability of producing a compression result without using compression.

Examples of effective compression may be found in FIGS. 16-19.

Accordingly embodiments may include a non-compression system (207) and a compression effect system (208).

In some embodiments, achieving compression effects may involve leveraging a combination efficiency. Accordingly, embodiments may include a combination efficiency leverage system (209).

One example of a combination efficiency leverage system may be stated as follows:

On average, one electronic data object representing the consolidated input of multiple electronic data objects may compress to a number of bytes that may be, on average, less than the number of bytes of compressing each of the multiple electronic data objects individually. This may be due to the fact that compression works best on larger files containing repeated information.

In a first example, input may contain one or more HTML elements with the name "link," each referring to a different location of electronic data objects:
<link href="style1.css" rel="stylesheet"type="text/css" />
<link href="style2.css" rel="stylesheet"type="text/css" />

If style1.css contains the following information:
outer {
background-color: #ffffff;
}

... and is compressed, there may not be much opportunity for compression. If style2.css contains the following information:
inner {
background-color: #ffffff;
}

... and is compressed, there is not much opportunity for compression. However, when:
<link href="style1.css" rel="stylesheet"type="text/css" />
<link href="style2.css" rel="stylesheet"type="text/css" />

... is replaced with:
<link href="./CS.sc?{%}" rel="stylesheet"type="text/css" />

... and ./CS.sc?{%} contains the following information:
outer {
    background-color: #ffffff;
}
inner {
    background-color: #ffffff;
}

... and is compressed, there may be a greater opportunity for compression.

For a second example, an input may contain one or more HTML elements with the name "script," each referring to a different location of said electronic data objects:
<script type="text/javascript" src="script1.js"></script>
<script type="text/javascript" src="script2.js"></script>

If script1.js contains the following information:
function foo( ){
    var x=1;
}

... and is compressed, there may not much opportunity for compression. If script2.js contains the following information:
function bar( ){
    var y=2;
}

... and is compressed, there may not much opportunity for compression. However, when:
<script type="text/javascript" src="script1.js"></script>
<script type="text/javascript" src="script2js"></script>

... Is replaced with:
<style type="text/javascript" src="./JS.sc?{%}"></script>

... and ./JS.sc?{%} contains the following information:
function foo( ){
    var x=1;
}

```
function bar( ){
  var y=2;
}
```
... and is compressed, there may be a greater opportunity for compression.

For a third example, an input may contain one or more HTML elements with the name "img," each referring to a different location of said electronic data objects:

<img src="image1.gif" />
<img src="image2.gif" />

If image1.gif contains the following information:
  71, 73, 70, 56, 57, 97, 1, 0, 1, 0, 128, 0, 0, 255, 255, 255, 255, 255, 255, 33, 249, 4, 1, 10, 0, 1, 0, 44, 0, 0, 0, 0, 1, 0, 1, 0, 0, 2, 2, 76, 1, 0, 59

... and is compressed, there may not much opportunity for compression. If image2.gif contains the following information:
  71, 73, 70, 56, 55, 97, 1, 0, 1, 0, 128, 1, 0, 0, 0, 0, 255, 255, 255, 44, 0, 0, 0, 0, 1, 0, 1, 0, 0, 2, 2, 68, 1, 0, 59

... and is compressed, there may not much opportunity for compression. However, when:
  <img src="image1.gif" />
  <img src="image2.gif" />
... is replaced with:
  <img src="./IS.sc?{%1}" style="background:url(./IS.sc?{%2}) %3px %4px no-repeat;" />
  <img src="./IS.sc ?{%1}" style="background:url(./IS.sc?{%2})%3px %4px no-repeat;" />
... and ./IS.sc?{%} contains the following information:
  1, 73, 70, 56, 57, 97, 1, 0, 1, 0, 128, 0, 0, 255, 255, 255, 255, 255, 255, 33, 249, 4, 1, 10, 0, 1, 0, 44, 0, 0, 0, 0, 1, 0, 1, 0, 0, 2, 2, 76, 1, 0, 59, 71, 73, 70, 56, 55, 97, 1, 0, 1, 0, 128, 1, 0, 0, 0, 0, 255, 255, 255, 44, 0, 0, 0, 0, 1, 0, 1, 0, 0, 2, 2, 68, 1, 0, 59

... and is compressed, there may a greater opportunity for compression.

More generally, in various embodiments, leveraging may involve replacing multiple programming code instructions having different source attributes with a single programming code instruction having a single source attribute. A single source attribute may be a single combined electronic data object (102) and a single combined electronic data indicator (222). The programming code may be HTML, and the programming code instruction may include <link href= . . . >, <script type= . . . >, <img src= . . . >, and <style type= . . . >. Of course, the foregoing example is merely illustrative, and should not be construed to limit the broader principles underlying the same, particularly as relates to leveraging combination efficiencies, though not limited to the same. Accordingly, embodiments may involve a multiple programming code instruction replacement processor (210) and a single programming code instruction single source attribute processor (211).

In various embodiments, effectively compressing may involve avoiding multiple requests and avoiding multiple provisions of electronic data objects (202). For example, wherein objects and pointers may be combined, as described herein, such combinations may avoid the necessity of requesting and providing objects stored at disparate locations. Accordingly, embodiments may include a multiple request avoidance processor and a multiple provision avoidance processor (212).

In various embodiments, effectively compressing may involve using a data association in an HTTP header to request and provide electronic data. Effectively compressing also may involve a client-server transaction, a TCP/IP transaction, an FTP transaction, an HTTP transaction, a World Wide Web transaction, a networked environment transaction, or the like.

Accordingly, a compressor in various embodiments may be a client-server transaction effective compressor, a TCP/IP transaction effective compressor, a FTP transaction effective compressor, a HTTP transaction effective compressor, a World Wide Web transaction effective compressor, and a networked environment effective compressor.

In various embodiments, effectively compressing may involve using a data association to request and provide an electronic data object (202) individually. For example, such use may involve separately providing an electronic data object (202) using one electronic data indicator (222) of the data association, even wherein the data association may include other associated objects and indicators. Similarly, such use may involve providing multiple electronic data objects (202) using multiple electronic data indicators (222) of the data association. Moreover, such provision may via one electronic data exchange transaction, in as much as the use of a single data association may obviate the need to access multiple disparate locations of such objects. It may be seen that embodiment may involve providing multiple electronic data objects (102) using multiple electronic data indicators (222) and avoiding multiple electronic data exchange transactions. Naturally, embodiments also may involve transmitting electronic data from the first location (201) to the second location (221).

Accordingly, embodiments may include an individual electronic data object request and provision system having an associated data processor (214), an electronic data object separate provision processor (215), an electronic data indicator use processor (216), a multiple electronic data object provision processor (217), and a multiple electronic data indicator use processor (218). Moreover, embodiments may comprise a single electronic data exchange transaction system (219) and a multiple electronic data exchange transaction avoidance system (220).

Figure 3:
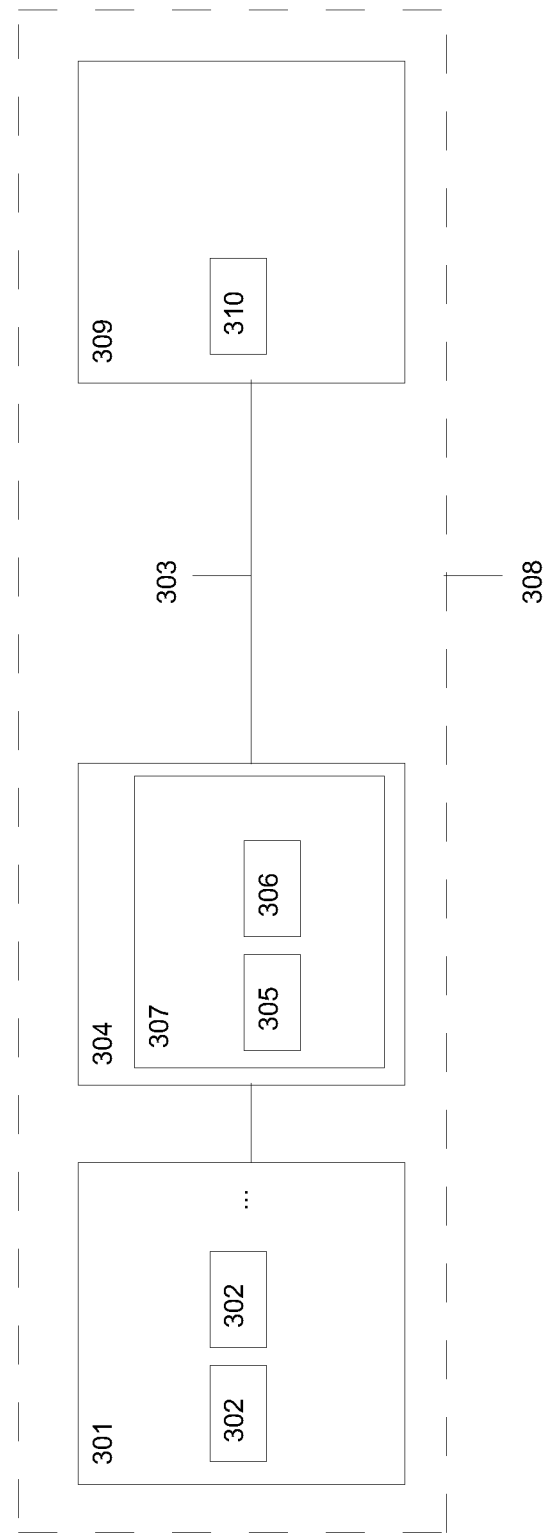
FIG. 3 is a schematic representation of an electronic data transmission effective rate augmentation apparatus in one exemplary embodiment.

Now with reference primarily to FIG. 3, embodiments of the inventive technology may involve a method for increasing the effective rate of transmitting electronic data and an electronic data transmission effective rate augmentation apparatus.

The method may involve storing an electronic data object (302) at a first location, such as perhaps a first electronic storage medium (301), perhaps as described elsewhere herein.

Embodiments may involve linking said first location (301) to a second location, such as perhaps a second electronic storage medium (309), via an electronic data communications network (303), perhaps as described elsewhere herein.

Embodiments may involve accessing the electronic data communications network (303) utilizing an electronic message assembly protocol and an electronic message addressing protocol. The term accessing may be understood to include making the network available to one or more electronic storage media to send and receive electronic data from the storage media. Moreover, in various embodiments, the electronic message assembly protocol may be TCP and the electronic message addressing protocol may be IP. Accordingly, embodiments may include an access point (304) responsive to an electronic message assembly protocol (305) and an electronic message addressing protocol (306).

Additionally, the electronic data communications network (303) in various embodiments may be a network having a benchmark network transmission rate for electronic data transmission via the network utilizing the electronic message assembly protocol and the electronic message addressing protocol. Such a benchmark may be any suitable standard or reference by which an accepted value for the rate of transmission of given types of electronic data may be quantified. Moreover, the benchmark may be understood to be tied to the conventional infrastructure elements of the network, including for example the standard electronic message assembly protocol and electronic message addressing protocol utilized by the network. Accordingly, embodiments may involve a benchmark network transmission rate (307) of an electronic data communications network (303) responsive to an electronic message assembly protocol (305) and an electronic message addressing protocol (306).

Embodiments may involve transmitting an electronic data object (302) from the first location (301) to the second location (309) via the electronic data communications network (303) at an effective transmission rate greater than the benchmark network transmission rate.

Accordingly, embodiments may involve an electronic data object transmission effective rate augmenter (308) responsive to a benchmark network transmission rate (307) and to which a first electronic storage medium (301), a second electronic storage medium (309), and an electronic data communications network (303) are responsive An effective transmission rate should be understood to include achieving a rate improved over the benchmark transmission rate, perhaps without actually transmitting data faster than the network's benchmark transmission rate permits. For example, if the electronic communications network transmits given types of electronic data at its benchmark rate, achieving an effective transmission rate greater than the benchmark may involve, for example, changing the nature of the input data, shortening the total length of the communication path, and the like, each perhaps while still transmitting electronic data at the network's benchmark transmission rate. Stated differently, in at least some embodiments, transmitting at an effective network transmission rate may involve the capability of producing an end result of transmitting electronic data at a greater rate, without actually achieving such greater rate.

Accordingly, transmitting may involve achieving an effective network transmission rate greater than a benchmark network transmission by transmitting up to 52.3% less data, and embodiments may include an up to 52.3% less data transmission effective rate augmenter.

Examples of transmitting an effective network transmission rate greater than the benchmark network transmission rate may be found in FIGS. 16-19.

Figure 4:
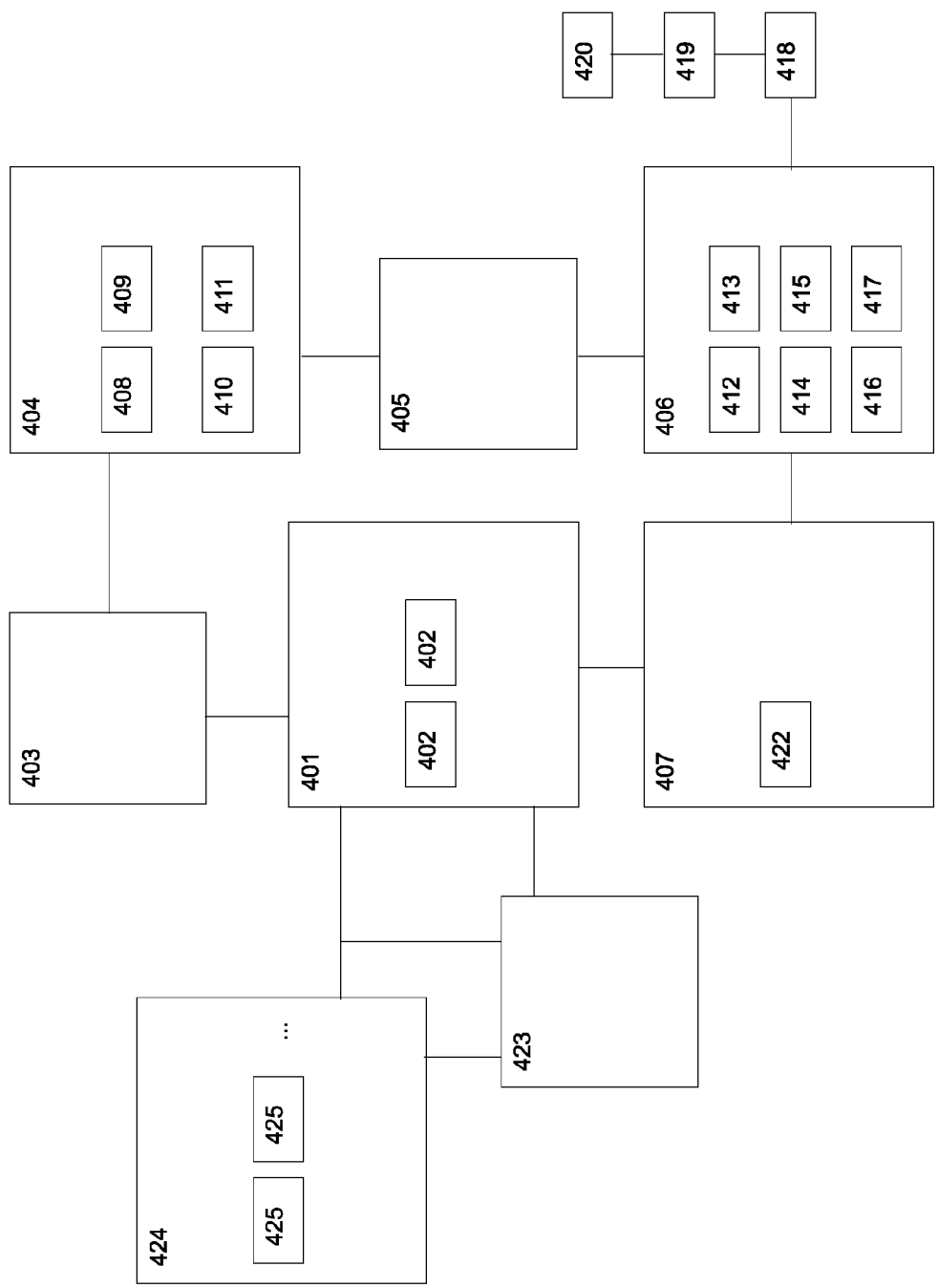
FIG. 4 is a schematic representation of an electronic spatial data combination apparatus in one exemplary embodiment.

Now with reference primarily to FIG. 4, embodiments of the inventive technology may involve a method for combining electronic spatial data and an electronic spatial data combination apparatus.

Embodiments may include multiple electronic spatial data objects (402) at a first location, such a first electronic storage medium (401), perhaps as described elsewhere herein.

Embodiments may involve automatically accessing multiple electronic spatial data objects (402). The term accessing may be understood to include making such electronic spatial data objects (402) available for electronic manipulation, such as for example by the commands of a programming language, by action of electronic processing, or the like. In some embodiments, accessing may involve storing at least one electronic spatial data object (402) at a first location (401) and storing at least one electronic spatial data indicator (425) at a second location (424) associated to the electronic spatial data object (402) at the first location.

Embodiments further may involve transmitting electronic data from the first location (401) to the second location (424). Accordingly, embodiments may include an automated electronic spatial data object accessor (403) responsive to multiple electronic data objects (402).

Electronic spatial data objects (402) may be understood to have spatial characteristics when their information content derives both from the value at a location plus the relationship of such location to another location, for example in a multi-coordinate system, such as an x, y system. Examples of electronic spatial data objects (402) may include image files, such as JPG files, GIF files, or PNG files.

Embodiments may involve automatically identifying at least one characteristic of each electronic spatial data object (402) relevant to contiguous combination of multiple electronic spatial data objects (402). This may involve seeking and recognizing a characteristic in each object to be used in a combination technique based on such characteristic. Examples of such characteristics may include identifying boundary, area, size, file format, image width, and image height characteristics of an electronic spatial data object (402), including both as related to the properties of the electronic data itself and as to any representation of such spatial data, for example an image. Accordingly, embodiments may include an automated contiguous combination characteristic identifier (404) responsive to an automated electronic spatial data object accessor (403). Such an identifier in various embodiments may be a boundary identifier, an area identifier, a size identifier, a file format identifier, an image width identifier, or an image height identifier.

For example, an electronic spatial data object (402) may contain input information having an HTML element with the name "img" that looks like the following:

<img src="image1.jpg" />

If the value for the "src" attribute refers to a resource that can be read, an attempt can be made to load the data read from the value of the src attribute into a bitmap object, the implementation of which may be specific to the platform on which the method is executing (Windows, Linux, etc.) If the attempt to load the bitmap succeeds, the image format, width, and height may be identified. Otherwise, the input information may be skipped. If the image format, width, and height are supported, the input may be processed. Otherwise, the input information may be skipped.

More generally, in various embodiments, identifying may involve executing at least one programming code instruction having a source attribute, loading the data of the source attribute into an electronic spatial data object map, and identifying a characteristic utilizing the electronic spatial data map. The programming code may be, for example, HTML, and the instruction may be, for example, <img src= . . . >, although other programming languages and instructions may be understood to be applicable as well. Accordingly an identifier in various embodiments may include a source attribute programming code instruction execution processor (408), a source attribute data loading processor (409) responsive to a source attribute programming code instruction execution processor (408), an electronic spatial data object map loading processor (410) responsive to a source attribute data loading processor (409), and a characteristic identification processor (411) responsive to an electronic spatial data object map loading processor (410).

Embodiments may involve automatically aggregating multiple electronic spatial data objects (402) having an automatically identified characteristic. Aggregating may be understood to involve bringing together those objects having the identified characteristic and making them available for subsequent action based on the identified characteristic. Accordingly, embodiments may involve an automated electronic spatial data aggregator (405) responsive to an automated contiguous combination characteristic identifier (404).

Embodiments may involve automatically contiguously combining multiple electronic spatial data objects (402) using each automatically identified characteristic. Combining may be understood to involve taking individual objects or indicators and integrating them into a form having at least one unitary element. Examples may include joining the objects automatically identified boundaries, minimizing automatically identified areas of the object, minimizing automatically identified sizes of the objects, combining the objects by file format, combining the objects by image width, and combining the objects by image height. Moreover, these examples may be illustrative of contiguously combining multiple electronic spatial data objects (402). Accordingly, embodiments may involve an automated electronic spatial data object contiguous combiner (406) responsive to an automated electronic spatial data aggregator (405), which in various embodiments may include an automatically identified boundary processor (412), an automatically identified area minimization processor (413), an automatically identified size minimization processor (414), an automatically identified file format combination processor (415), and an automatically identified image width combination processor (416), and an automatically identified image height combination processor (417).

In one embodiment, an example of contiguously combining multiple electronic spatial data objects may be as follows:
1. Let the variable y equal 0.
2. Sort the collection of objects so that an object A with a width greater than object B is located higher in the list than object B.
3. In the case when two object have the same width, sort the collection of object so that an object A with a height greater than object B is located higher in the list than object B.
4. In the case when two object have the same width and the same height, it does not matter if object A is located higher in the list than object B or if object B is located higher in the list than object A.
5. Go through the collection of object, starting with the object located highest in the list and working toward the object located lowest in the list.
6. If the object has already been added to a combined object, skip it.
7. If the combined object has not been created, create it with a width of the object and a height of the object. Otherwise, if the combined object has been created, let the variable y equal the height of the combined object, create a new combined object with a width of the combined object and a height equal to the height of the combined object plus the height of the object. Copy the combined object to the new combined object. Set the combined object equal to the new combined object.
8. Add the object to the combined object at X coordinate 0 and Y coordinate equal to the y variable.
9. Create a collection to hold one or more rectangles, each rectangle comprising of an X coordinate, a Y coordinate, a width, and a height.
10. Create a rectangle with an X coordinate equal to the width of the object, a Y coordinate equal to the y variable, a width equal to the width of the combined object minus the width of the object, and a height equal to the height of the object. Effectively, this is the available space to the right of the object, extending to the right edge of the combined object and to the bottom edge of the combined object. Add the rectangle to the collection of rectangles.
11. Go through the collection of objects, starting with the next object, working toward the object located lowest in the list.
12. If the next object has already been added to the combined object, skip it.
13. Go through the collection of rectangles.
14. Do the following if the rectangle's width is greater than or equal to the next object's width and the rectangle's height is greater than or equal to the next object's height: Add the next object to the combined object at an X coordinate equal to the rectangle's X coordinate and a Y coordinate equal to the rectangle's Y coordinate. Create a 2nd rectangle with an X coordinate equal to the rectangle's X coordinate plus the width of the next object, a Y coordinate equal to the rectangle's Y coordinate, a width equal to the width of the combined object minus the rectangle's X coordinate minus the next object's width, and a height equal to the next object's height. Effectively, this 2nd rectangle is the available space to the right of the next object, extending to the right edge of the combined object and the bottom edge of the next object. Add the 2nd rectangle to the collection of rectangles. Create a 3rd rectangle with an X coordinate equal to rectangle's X coordinate, a Y coordinate equal to the rectangle's Y coordinate plus the height of the next object, a width equal to the width of the combined object minus the rectangle's X coordinate, and a height equal to the rectangle's height minus the next object's height. Effectively, this 3rd rectangle is the available space to the bottom of the next object, extending to the right edge of the combined object and the bottom of the rectangle. Add the 3rd rectangle to the collection of rectangles. Remove the rectangle from the collection of rectangles.

More generally, combining electronic spatial data objects (402) may involve creating an order of the objects based on the identified characteristics, eliminating redundant objects from the order, and sequentially contiguously combining each object successively to create a single contiguously combined electronic spatial data object based on the order. Accordingly, embodiments may include a multiple electronic spatial data objects ordering processor (418) responsive to said automated contiguous combination characteristic identifier (404), a redundant electronic spatial data object eliminator (419) responsive to said multiple electronic spatial data objects ordering processor (418), and a successive order electronic spatial data object sequential contiguous combiner (420) responsive to said redundant electronic spatial data object eliminator (419).

Creating a single contiguously combined electronic spatial data object in various embodiments may involve creating a single contiguously combined electronic spatial data object up to 34.8% less than the size of the multiple electronic spatial data objects (402), creating a single contiguously combined electronic spatial data object having at least one common characteristic derived from a characteristic identified from the multiple electronic spatial data objects (402), and, of course, creating an image file, for example a JPG, GIF, or PNG file. Accordingly, embodiments may include an up to 34.8% reduced size electronic spatial data object contiguous combiner, a multiple electronic spatial data object common characteristic identification processor (421), and an image file creator, naturally include a JPG creator, a GIF creator, and a PNG creator.

Embodiments also may include an electronic data transmitter (423), a second electronic storage medium (424), and an electronic data indicator (425) stored on a second electronic storage medium (424).

Figure 5:
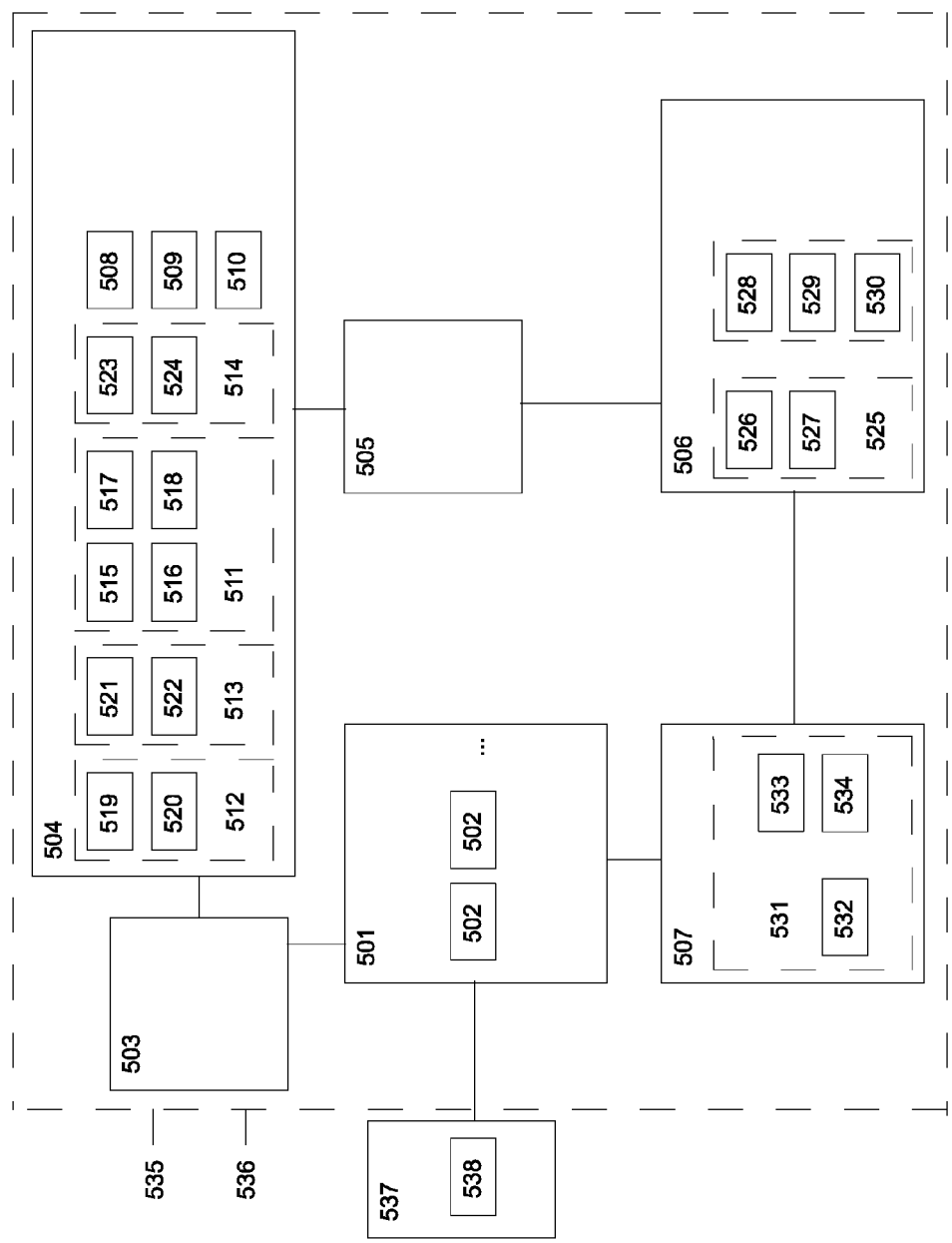
FIG. 5 is a schematic representation of an electronic data threshold combination apparatus in one exemplary embodiment.

Now with reference primarily to FIG. 5, embodiments of the inventive technology may involve a method for threshold combining electronic data and an electronic data threshold combination apparatus.

Embodiments may involve automatically accessing multiple electronic data objects (502). The term accessing may be understood to include making such electronic data objects (502) available for electronic manipulation, such as for example by the commands of a programming language, by action of electronic processing, or the like. The electronic data objects (502) in various embodiments may include multiple CSS data objects, multiple script data objects, and multiple image data objects. Accordingly, embodiments may include multiple electronic data objects (502) stored at a first location, such as a first electronic storage medium (501) and an automated electronic data object accessor (503) responsive to said multiple electronic data objects (502). In various embodiments, such objects may include multiple CSS data objects, multiple script data objects, and multiple image data objects.

Embodiments further may involve storing at least one electronic indicator (538) at a second location, such as a second electronic storage medium (537), associated to an electronic data object (502), and transmitting the electronic data from a first location, such as first electronic storage medium (501), to the second location, such as second electronic storage medium (537). Accordingly, embodiments may include an electronic data transmitter linking a first electronic storage medium (501) and a second electronic storage medium (537).

Embodiments may involve automatically identifying at least one characteristic of each electronic data object (502) relevant to a threshold criterion for combining the objects. This may involve seeking and recognizing a characteristic in each object to be used in evaluating a threshold for determining whether or not the object will be combined with other objects.

Examples of such characteristics may include object size and object number. Accordingly, embodiments may include an automated threshold criterion combination characteristic identifier (504) responsive to an automated electronic data object accessor (503), which in embodiments may be an object size identifier, object number identifier, or the like.

In one example, automatically identifying may involve the following:
- If the object contains an HTML element with the name "link" or "script" or "img" it is automatically identified as All.
- If the object contains an HTML element with the name "link" or "script" or "img" and there is no query string in the addressed electronic data indicator it is automatically identified as No Query String.
- For example, the following addressed electronic indicator has a query string:
  <img src="image.jpg?XYZ=123" />
- And for example, the following addressed electronic indicator does not have a query string:
  <img src="image jpg" />
- If the object contains an HTML element with the name "link" and the addressed electronic indicator ends with ".css" it is automatically identified as CSS, JS, Image.
- If the object contains an HTML element with the name "script" and the addressed electronic indicator ends with ".js" it is automatically identified as CSS, JS, Image.
- If the object contains an HTML element with the name "img" and the addressed electronic indicator ends with a supported extension (such as ".gif" for GIF images, ".jpg" for JPEG images, or ".png" for PNG images) it is automatically identified as CSS, JS, Image.

More generally, automatically identifying may involve automatically identifying an all characteristic, which may involve automatically identifying as all, HTML programming code having at least one element with a name selected from the group consisting of link, script, img, or style. Accordingly, various embodiments may include an all characteristic identifier, which may include an HTML programming code link name element processor (508), an HTML programming code script name element processor (509), and an HTML programming code img name element processor (510).

More generally, automatically identifying may involve automatically identifying a no query string characteristic, which may involve automatically identifying as no query string, HTML programming code having at least one element with a name selected from the group consisting of link, script, img, and having no query string in an associated electronic data indicator. Accordingly, various embodiments may include a no query string characteristic identifier, which may include HTML programming code link name element processor (515), an HTML programming code script name element processor (516), and an HTML programming code img name element processor (517), and wherein each said processor further comprises a processor responsive to an associated electronic indicator having no query string (518).

More generally, automatically identifying may involve automatically identifying a CSS characteristic, which may involve automatically identifying as CSS, HTML programming code having at least one element with the name link, and having an associated electronic data indicator containing a .css element. Accordingly, various embodiments may include a CSS characteristic identifier (512), which may include HTML programming code link name element processor (519), wherein said processor further comprises a processor responsive to an associated electronic indicator containing a .css element or css file extension (520).

More generally, automatically identifying may involve automatically identifying a script characteristic, which may involve automatically identifying as script, HTML programming code having at least one element with the name script, and having an associated electronic data indicator containing an element selected from the group consisting of a .js element and a script file extension. Accordingly, various embodiments may include a script characteristic identifier (513), which may include HTML programming code script name element processor (521), wherein said processor further comprises a processor responsive to an associated electronic indicator containing an element selected from the group consisting of a .js element, script element and a script file extension (522).

More generally, automatically identifying may involve automatically identifying an image characteristic, which may involve automatically identifying as image, HTML programming code having at least one element with the name img, and having an associated electronic data indicator containing an element selected from the group consisting of .jpg, .gif, .png, and an image file extension. Accordingly, various embodiments may include a image characteristic identifier (514), which may include HTML programming code img name element processor (523), wherein said processor further comprises a processor responsive to an associated electronic indicator containing an element selected from the group consisting of .jpg, .gif, .png, img element and image file extension (524).

Embodiments may involve automatically aggregating multiple electronic data objects (502) having at least one automatically identified characteristic relevant to a threshold criterion for combining the objects. Aggregating may be understood to involve bringing together those objects having the identified characteristic and making them available for subsequent action based on the identified characteristic. Accordingly, embodiments may include an automated electronic data object aggregator (505) responsive to an automated threshold criterion combination characteristic identifier (504).

Embodiments may involve automatically determining if a threshold criterion for combining multiple electronic data objects (502) has been satisfied. Accordingly, embodiments may include an automated threshold criterion determiner (506) responsive to an automated electronic data object aggregator (505).

In one example, automatically determining may involve storing a collection of character sequences generated that uniquely identify one or more electronic data objects (502). When the collection contains more character sequences than a threshold for such character sequences, it may be automatically determined that the threshold has been exceeded. Accordingly, embodiments may include a unique character sequence identification generator (528) responsive to said multiple electronic data objects (502), a unique character sequence identification number determination processor (529) responsive to said unique character sequence identification generator (528), and a unique character sequence identification threshold criterion processor (530) responsive to said unique character sequence identification number determination processor (529).

Naturally, any suitable criterion capable of automated electronic evaluation may be utilized as a threshold criterion.

More generally, automatically determining may involve automatically determining a threshold value for said multiple electronic data objects (502) based on an automatically identified characteristic for each said electronic data object (502) individually, automatically comparing the automatically determined threshold value to a threshold criterion, and automatically evaluating if the threshold criterion has been exceeded based on an automatic comparison. Accordingly, embodiments may include an automated multiple electronic data object threshold value determination processor (525) responsive to an automated individual electronic data object identified characteristic processor, which may include an automated threshold criterion comparator (526) and an automated threshold criterion evaluator (527).

Embodiments may involve automatically combining multiple electronic data objects (502) in accordance with an automatic determination if a threshold criterion for combining the objects has been satisfied. Combining may be understood to involve taking individual objects and integrating them into a form having at least one unitary element. Accordance may be evaluated based on the specific threshold criterion involved— some embodiments, for example, may involve automatically combining objects if a threshold criterion has been met or exceeded and automatically not combining objects if a threshold criterion has not been met or exceeded. Accordingly, embodiments may include an automated electronic data object combiner (507) responsive to an automated threshold criterion determiner (506), which may include an exceeded threshold value combiner.

Various embodiments may involve automatically effecting a fallback combination if a threshold criterion has been met or exceeded. One example of a fallback combination may be stated as follows:

Per input, per type (styles, scripts, images):
Start at the All state.
If in the All state and the number of character sequences that uniquely identify a consolidated input exceeds the threshold, automatically effect a fallback to the No Query String state. Clear the collection of character sequences generated that uniquely identify a consolidated input.
If in the No Query String state and the number of character sequences that uniquely identify a consolidated input exceed the threshold, automatically effect a fallback to the CSS, JS, Image state. Clear the collection of character sequences generated that uniquely identify a consolidated input.
If in the CSS, JS, Image state and the number of character sequences that uniquely identify a consolidated input exceeds the threshold, automatically effect a fall back to the None state. Clear the collection of character sequences generated that uniquely identify a consolidated input.

More generally, embodiments may involve falling back hierarchically by state. This may involve first falling back to a no query string state from an all state, if a number of character sequences uniquely identifying said multiple electronic data objects exceeds a threshold criterion number for said number of character sequences; second falling back to a state selected from the group consisting of a CSS state, a JS state, and an image state, from said no query string state, if a number of character sequences uniquely identifying said multiple electronic data objects exceeds a threshold criterion number for said number of character sequences, and wherein said multiple electronic data objects are selected from the group consisting of CSS data, JS data, and image data; and third falling back to a none state from said state selected from said group consisting of a CSS state, a JS state, and an image state, if a number of character sequences uniquely identifying said multiple electronic data objects exceeds a threshold criterion number for said number of character sequences, and wherein said multiple electronic data objects are selected from said group consisting of CSS data, JS data, and image data.

Accordingly, in various embodiments an automated electronic data object combiner (507) may be a fallback combination combiner utilizing a fallback combination hierarchy (531) having a no query string state (532), a CSS, JS, image state (533), and a none state (534), perhaps as described above.

Moreover, an automated electronic data object combiner (507) in various embodiments may be all state conditional all multiple electronic data object combiner; a no query string state conditional multiple electronic data object combiner, wherein said combiner is responsive only to multiple electronic data objects having no query string in an associated electronic indicator; a CSS state conditional multiple electronic data object combiner, wherein said combiner is responsive only to said multiple electronic data objects comprising CSS data and having an associated electronic data indicator containing a .css element; a JS state conditional multiple electronic data object combiner, wherein said combiner is responsive only to said multiple electronic data objects comprising script data and having an associated electronic data indicator containing a .js element; an image state conditional multiple electronic data object combiner, wherein said combiner is responsive only to said multiple electronic data objects comprising image data and having an associated electronic data indicator containing an element selected from the group consisting of JPG data, GIF data, PNG data; and a none state conditional multiple electronic data object non-combiner.

Moreover, automatically combining electronic data objects (502) may involve combining the objects according to identified state. One example of this may be stated as follows:

Per input, per type (styles, scripts, images):

If in the All state, consolidate all input.

If in the No Query String state, only consolidate input that does not have a query string in an addressed electronic data indicator.

If in the CSS, JS, Image state, and the input is a link, only consolidate input that has an addressed electronic data indicator ending with ".css"

If in the CSS, JS, Image state, and the input is a script, only consolidate input that has an addressed electronic data indicator ending with ".js"

If in the CSS, JS, Image state, and the input is an image, only consolidate input that has an addressed electronic data indicator ending with a supported extension (such as ".gif" for GIF images, ".jpg" for JPEG images, or ".png" for PNG images).

If in the None state, consolidate no input.

More generally, automatically combining according to state may involve combining all multiple electronic data objects, if in an all state; combining only multiple electronic data objects having no query string in an associated electronic indicator, if in a no query string state; combining only multiple electronic data objects having an associated electronic data indicator containing a .css element, if in a CSS state, wherein said multiple electronic data objects comprise CSS data; combining only multiple electronic data objects having an associated electronic data indicator containing a .js element, if in a JS state, wherein said multiple electronic data objects comprise script data; and combining only said multiple electronic data objects having an associated electronic data indicator containing an element selected from the group consisting of JPG data, GIF data, PNG data, or image file extension data, if in an image state, wherein said multiple electronic data objects comprise image data.

The method for threshold combining electronic data in various embodiments may be a method for safeguarding the operation of a computing device, perhaps generally by avoiding detrimental operating conditions when the computing device is supplied with too much data for safe processing. As an example, the architecture or the World Wide Web often may resulting in the dynamic generation of electronic data, too much of which can adversely impact the operation of server or client computing devices. The threshold aspects described herein may allow for compensating for dynamic generation of electronic data, including compensating for CSS information, script information, image information, World Wide Web page content information, and like kinds of information. Accordingly, embodiments may include a computing device operation safeguard (535) and dynamically generated electronic data compensator (536), which may be a CSS information compensator, a script information compensator, an image information compensator, and a World Wide Web page content information compensator.

Figure 6:
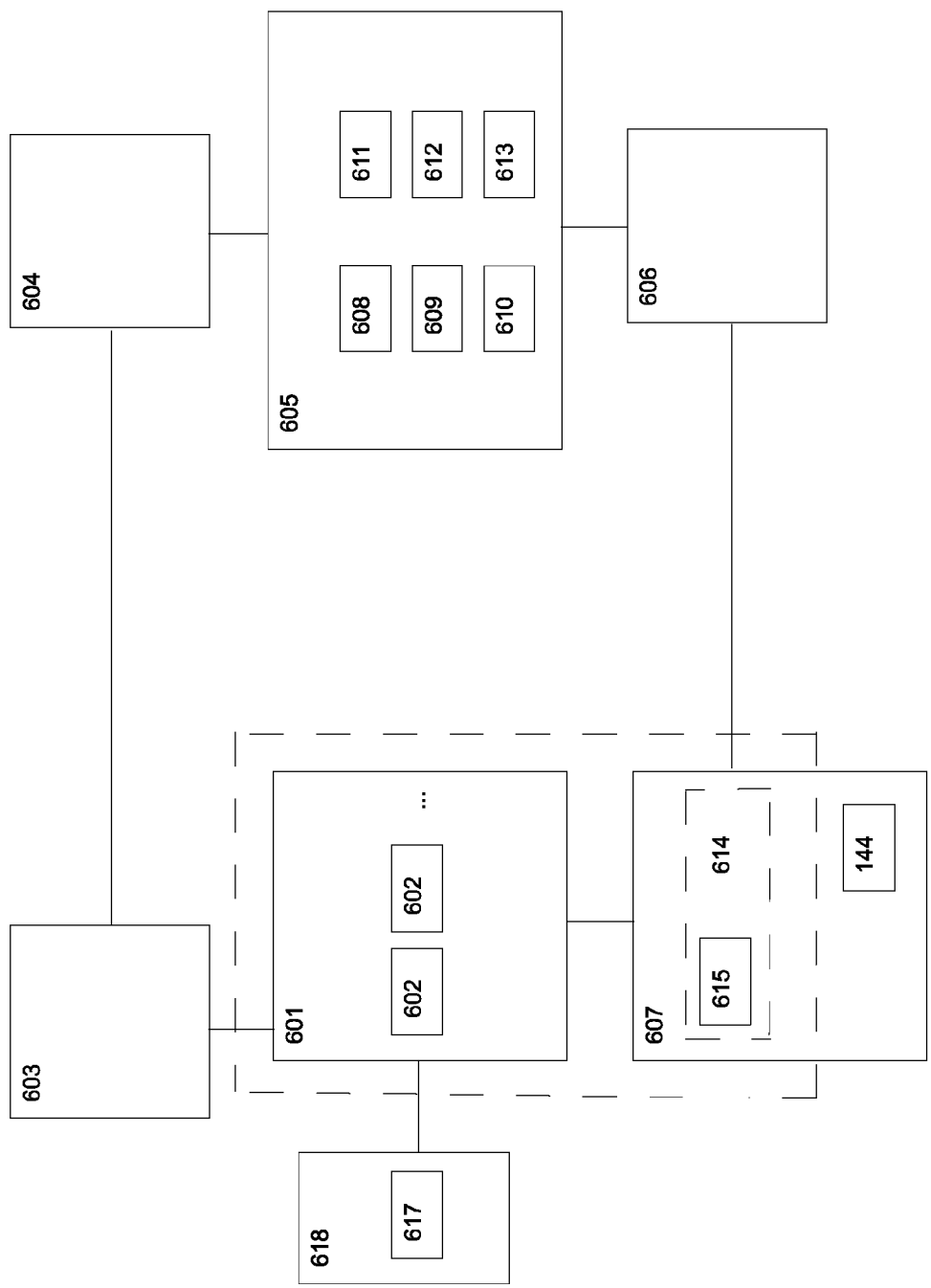
FIG. 6 is a schematic representation of an electronic spatial data compression apparatus in one exemplary embodiment.

Now with reference primarily to FIG. 6, embodiments of the inventive technology may involve a method for compressing electronic spatial data and an electronic spatial data compression apparatus.

Embodiments may involve accessing multiple electronic spatial data objects (602). Accordingly, embodiments may include an electronic spatial data object accessor (603) responsive to multiple electronic spatial data objects (602).

The term accessing may be understood to include making such electronic spatial data objects (602) available for electronic manipulation, such as for example by the commands of a programming language, by action of electronic processing, or the like. In some embodiments, accessing may involve storing at least one electronic spatial data object (602) at a first location, such as a first electronic storage medium (601), and storing at least one electronic spatial data indicator (617) at a second location, such as a second electronic storage medium (618), associated to the electronic spatial data object (602) at the first location. Embodiments further may involve transmitting electronic data from the first location (601) to the second location (618).

Accordingly, embodiments may include multiple electronic spatial data objects (602) stored on at least one electronic storage medium (601), multiple electronic data indicators (617) stored on a second electronic storage medium (618), and an electronic transmitter (619) linking a first electronic storage medium (601) and a second electronic storage medium (618).

Electronic spatial data objects (602) may be understood to have spatial characteristics when their information content derives both from the value at a location plus the relationship of such location to another location, for example in a multi-coordinate system, such as an x, y system. Examples of electronic spatial data objects (402) may include image files, such as JPG files, GIF files, or PNG files.

Embodiments may involve aggregating multiple electronic spatial data objects (602) for combining the objects. Aggregating may be understood to involve bringing together those objects having the identified characteristic and making them available for subsequent action based on the identified characteristic. Accordingly, embodiments may involve an electronic spatial data object aggregator (604) responsive to an electronic spatial data object accessor (603).

Embodiments may involve combining multiple electronic spatial data objects (602). Combining may be understood to involve taking individual objects and integrating them into a form having at least one unitary element. Examples may include sequentially combining, such as wherein individual objects may be combined in succession, contiguously combining, such as wherein individual objects combined in contact, hierarchically combining, such as wherein individual objects or pointers may be combined in rank, combining the objects by file format, combining the objects by image width, and combining the objects by image height. Examples further may include creating at least one common characteristic from separate characteristics, such as a location characteristic, a name characteristic, an address characteristic, a file format characteristic, an image width characteristic, an image height characteristic, and the like.

Accordingly, embodiments may include an electronic spatial data object combiner (605) responsive to an electronic spatial object aggregator (604), which may be a sequential combiner, a contiguous combiner, a hierarchical combiner, a file format combiner, an image width combiner, an image height combiner, or a common characteristic combiner. Moreover, a common characteristic combiner in various embodiments may have a location characteristic processor (608), a name characteristic processor (609), an address characteristic processor (610), a file format processor (611), an image width processor (612), and an image height processor (613).

Embodiments may involve creating a single combined electronic spatial data object, including of course a single combined image file, such as a single combined JPG, a single combined GIF, a single combined PNG, or the like. Accordingly, embodiments may include a single combined electronic spatial data object creator (606) responsive to an electronic spatial data object combiner (605), which may be in various embodiments a single combined image file creator, such as a JPG creator, a GIF creator, and a PNG creator.

Embodiments may involve electronically compressing a single combined electronic spatial data object to create an electronically compressed combined electronic spatial data object. Any suitable compression technology may be utilized, including for example GZIP and DEFLATE. Moreover, such compression may involve achieving improved compression relative to compressing multiple uncombined electronic spatial data objects (602), and may result in creating a compressed combined electronic spatial data object up to 34.8% less than the size of the uncombined multiple electronic spatial data objects (602). Accordingly, embodiments may include a combined electronic spatial data object electronic compressor (607) responsive to a single combined electronic spatial data object creator (606). Such a compressor in various embodiments may include a GZIP compressor and a DEFLATE compressor, and may utilize a relative improved compression achievement processor (614) and include an up to 34.8% relative improved compression achievement processor.

In this manner, electronically compressing a single combined electronic spatial data object may be seen as achieving multiple effective compression efficiencies, for example by leveraging a combination efficiency and leveraging a compression efficiency to creating an effective compression greater than that achievable simply by compressing uncombined electronic spatial data objects (602). Accordingly, embodiments may include a multiple effective compression efficiency processor, which may include a combination efficiency processor and a compression efficiency processor.

Moreover, embodiments may involve retaining a separately usable functionality of each electronic spatial data object (602) individually, notwithstanding their compressed and combined nature in a resulting compressed combined electronic spatial data object. For example, applications may involve separately utilizing at least one electronic spatial data object (602) individually, which may involve retrieving the object individually, perhaps such as by retrieving an individual image file. Accordingly, embodiments may include an individual electronic data object separate use functionality preservation processor (615), which may include an individual electronic data object separate use functionality utilization processor. Embodiments also may include an individual electronic spatial data object retrieval architecture (616), which may include an individual image file retrieval architecture.

Figure 7:
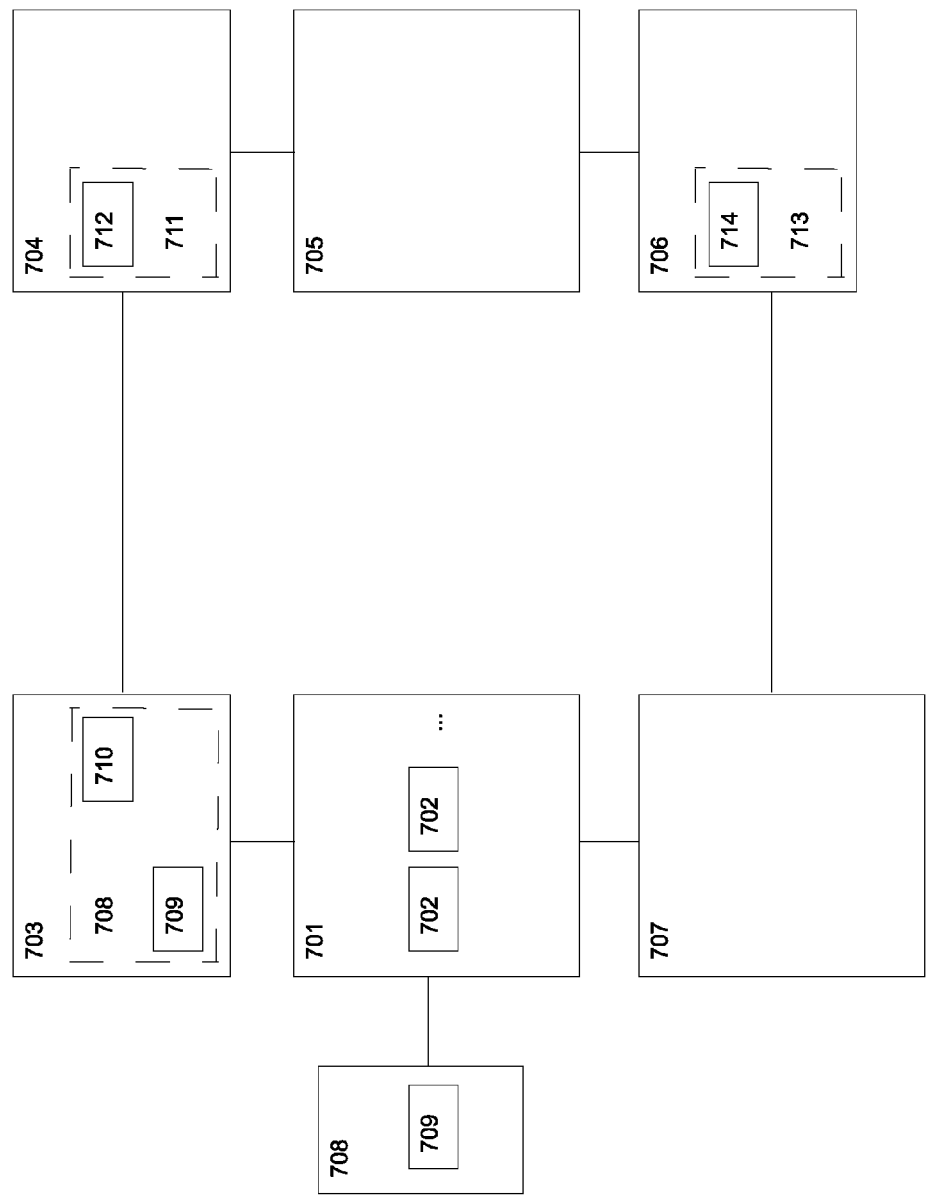
FIG. 7 is a schematic representation of a streamlined electronic data transmission apparatus in one exemplary embodiment.

Now with reference primarily to FIG. 7, embodiments of the inventive technology may involve a method for transmitting streamlined electronic data and a streamlined electronic data transmission apparatus.

Embodiments may involve storing an electronic data object (702) at a first location and an electronic data indicator (709) at a second location, perhaps as described elsewhere herein. Accordingly, embodiments may include a first electronic storage medium (701) having an electronic data object (702) stored thereon. Certain embodiment also may include a second electronic storage medium having a least one electronic data indicator stored thereon.

Embodiments further may involve automatically recognizing a use for the electronic data object (702) at a second location (708), automatically determining constituent parts of the electronic data object (702) necessary for use at the second location (708) and constituent parts of the electronic data object (702) unnecessary for use at the second location (708), and automatically selectively removing the constituent parts of the electronic data object (702) unnecessary for use at the second location.

Accordingly, embodiments may include an automated second location electronic data object use recognizer (703) responsive to an electronic data object (702), an automated electronic data object second location use constituent part determiner (704) responsive to said automated second location electronic data object use recognizer (703), an automated electronic data object second location dispensable constituent part determiner (705) responsive to said automated second location electronic data object use recognizer (703), and an automated streamlined electronic data object creator (706) responsive to an automated electronic data object second location use constituent part determiner (704) and an automated electronic data object second location dispensable constituent part determiner (705).

The foregoing steps of recognizing, determining, and removing may involve utilizing contextual awareness of the second location. Accordingly, embodiments may include a second location contextual awareness processors (708), (711), and (713).

With respect to the step of recognizing, for example, utilizing contextual awareness may involve differentiating between capable uses and actual uses for an electronic data object (702) at the second location. Such uses may be tied to the type of data comprising the electronic data object (702), for example distinguishing among capable and actual uses for various styles in CSS data, distinguishing among capable and actual uses for scripts among script data, distinguishing among capable and actual uses of images in image data, and the like. Accordingly, embodiments may involve a capable use differentiator (709) and an actual use differentiator (710), which differentiators naturally may be CSS data differentiators, script data differentiators, and image data differentiators.

With respect to the steps of determining, utilizing a contextual awareness may involve determining constituent parts of the electronic data object (708) to be actually used at the second location. Again, this may be tied to the type of data, for example, determining which styles of CSS data actually will be used, which scripts of script data actually will be used, which images of image data actually will be used, and the like. Accordingly, embodiments may include an electronic data object constituent part second location actual use determiner (712).

With respect to the step of removing, utilizing contextual awareness may involve selectively removing constituent parts of the electronic data object (702) that will not be used at the second location. This may involve removing styles from CSS data that will not be used, scripts from script data that will not be used, images from image data that will not be used, and the like. Accordingly, embodiments may include a second location dispensable constituent part selective remover (714).

In this manner, a streamlined electronic data object may be created at the first location based on use characteristics at the second location, such that the streamlined data object may only include those constituent parts actually to be used at the second location.

For example, an electronic data object (702) in various embodiments may be CSS data, script data, or image data. Conventional World Wide Web architectures may require a client to request and a server to provide sets of CSS, script, and image information, even where not all of the information may actually be used at the client. Where a server can recognize, determine, and selectively remove unnecessary information based on the actual uses for such information at the second location, for example by utilizing contextual awareness as described above, streamlined electronic data objects may be created.

Such streamlined electronic data objects naturally may result in efficiency increases in the storage and transmission for such objects. For example, embodiments may involve electronically transmitting a streamlined electronic data object from a first location (701) to a second location (708), perhaps involving transmitting up to 52.3% less data as compared to unstreamlined transmission. Accordingly, embodiments may include an automated streamlined electronic data object transmitter (707) responsive to an automated streamlined electronic object creator, which may be in various embodiments a 52.3% less data automated streamlined electronic data object transmitter.

Figure 8:
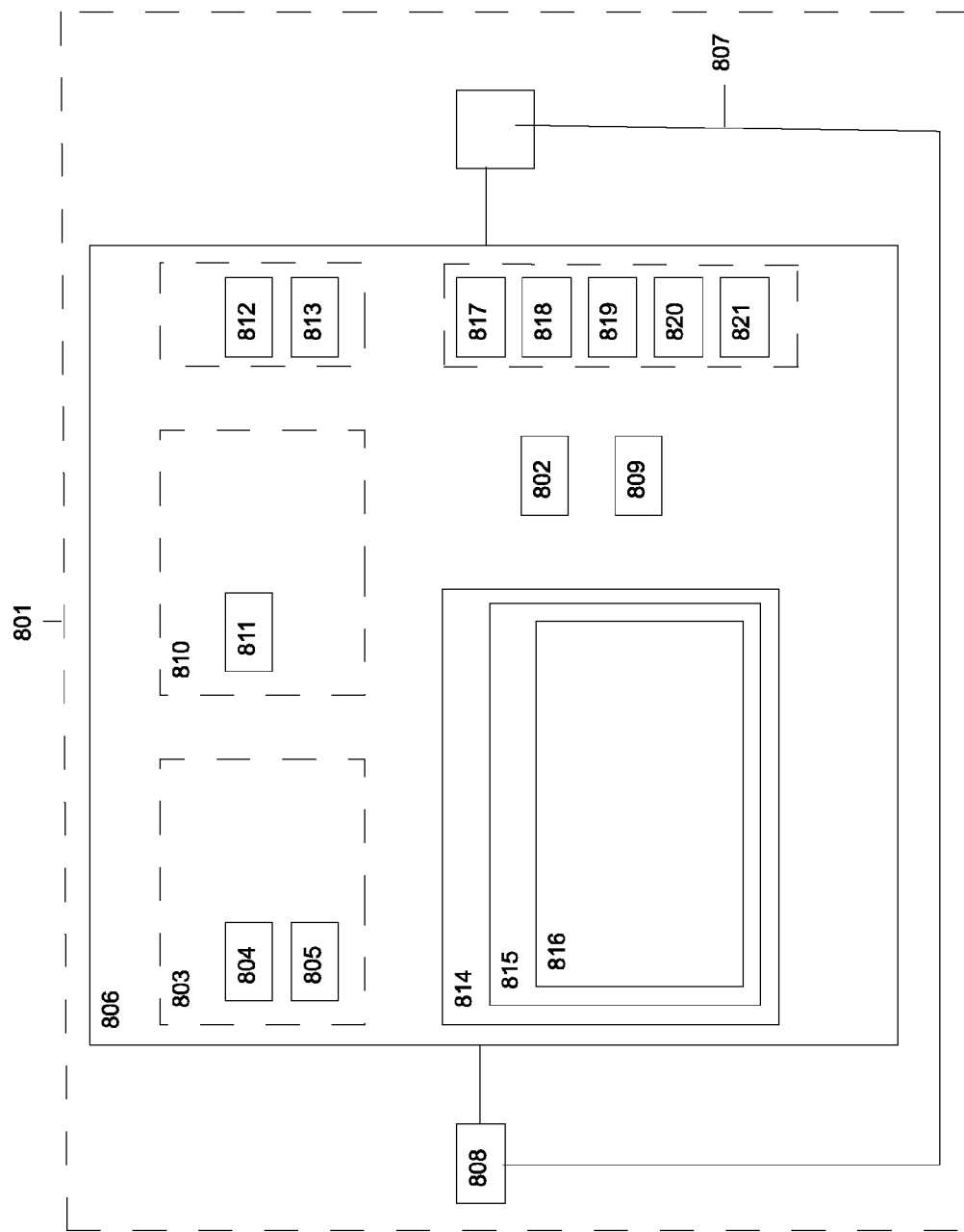
FIG. 8 is a schematic representation of a one-sided self-contained electronic data exchange transaction implementation architecture in one exemplary embodiment.

Now with reference primarily to FIG. 8, embodiments of the inventive technology may involve self-containing implementation of various methods described herein on one side of an electronic data exchange transaction. In some embodiments, this may involve avoiding counterpart implementation of such a method on the other side of an electronic data exchange transaction. An electronic data exchange transaction may be understood to include the transmission and processing of at least one item of electronic data, wherein such data may include electronic data objects and electronic data indicators. Examples of electronic data exchange transactions may include server-client transactions, such as may be used to load a Web page.

Self-containing implementation on one side of an electronic data exchange transaction may involve effecting the method entirely at or by an implementing participant to the transaction, for example perhaps entirely at or by a server in a server-client transaction. Perhaps similarly, avoiding counterpart implementation on another side of an electronic data exchange transaction may involve taking no sua sponte steps to implement the method at or by a second or subsequent participant to the transaction, or perhaps relying on the implementing participant to initiate or carry out the steps of the method, for example by a client in a server-client transaction. More generally, examples may include executing programming code on one side of an electronic data exchange transaction and avoiding counterpart execution of programming code on another side of the transaction.

Accordingly, embodiments may include a one-sided self-contained data exchange transaction implementation architecture (801) and an electronic data exchange transaction opposed side counterpart implementation avoidance processor (802). Embodiments also may include a one-sided electronic data exchange transaction programming code execution processor (803) and an electronic data exchange transaction opposed side counterpart programming code execution avoidance processor (804).

In some embodiments, the execution of programming code may involve intermediating between a server and client. Intermediating may be understood to include acting between participants to the transaction. Even where the intermediary may be located at one of the participants to the transaction, such as at a server, the intermediary may not interfere with the operation of the participant itself, such as where programming code may be executed independently from and perhaps not otherwise interact with the server's own software.

In a server-client architecture, for example, intermediating may involve allowing a request from a client to pass through the intermediary, allowing a server to process the request from the client without interference from the intermediary, and intercepting a response from the server to the client before allowing the response to pass through. In this example, the response may then be acted upon by the intermediary at the point of intercept. Such a client request, for example, may be a request for Web page information, and in some embodiments, intercepting may involve accessing at least one combined electronic data object utilizing at least one combined electronic data indicator, perhaps as described elsewhere herein. Of course, this example relating to a server-client architecture is for illustrative purposes only, and should not be construed to limit the broader principles involved.

Accordingly, embodiments may involve an intermediary between a server and a client (806), a client request pass-through (807), a server-side client request processor (808), a server response intercept (809), and a combined electronic data object access processor responsive to at least one combined electronic data indicator (810).

In one example, self-containing implementation may be accomplished as follows:

When a client sends a request for a Web page to a server, it may be for static content or dynamic content. Either way, the programming code may let the Web server handle the request, and may intercept the response before it is sent to the client.

If the response does not have an HTTP status code of 200 (OK) or does not have a Content-Type header with the value of "text/html" it may cease processing.

It may retrieve values for the following headers from the client:

Accept-Charset
Accept-Language
Cookie
User-Agent

It may retrieve values for the following headers from the response:

Content-Encoding
Set-Cookie

If the response is already compressed, as indicated by a value such as "gzip" or "deflate" in the Content-Encoding header, the response may be decompressed.

It then may process the decompressed response.

If, during processing, it encounters an addressed data indicator that is to be collocated or combined, it may request the resource on behalf of the client by passing the following headers:

Accept (Set to */*)
Accept-Encoding (Set to gzip, deflate)
Accept-Charset (Set to the value retrieved from the Accept-Charset header from the client)
Accept-Language (Set to the value retrieved from the Accept-Language header from the client)
Cookie (If the request is being made to the same host the response was intercepted from, set to the value retrieved from the Cookie header from the client + the value retrieved from the Set-Cookie header from the response)
Host (Set to the host the request is being sent to)
Referer (Set to the URL of the response that was intercepted)
User-Agent (Set to the value retrieved from the User-Agent header from the client)
X-Forwarded-For (Set to the IP address the response that was intercepted is being sent to)
If the value retrieved from the Accept-Encoding header from the client is "deflate" the new response may be compressed using deflate without the gzip wrapper (this may save 22 bytes per response).

If the value retrieved from the Accept-Encoding header from the client is "gzip" the new response may be compressed using deflate with the gzip wrapper.

After processing is complete, it may clear the original response. It may send the new response to the client by passing the following headers:

Content-Encoding (If the new response was compressed using deflate without the gzip wrapper, set to "deflate"; if the new response was compressed using deflate with the gzip wrapper, set to "gzip"; otherwise, this header is not set)

Content-Type (Set to text/html)

Set-Cookie (Set to the value of the Set-Cookie header in the original response, if applicable)

The programming code may expect one of the following subsequent requests to come from the client for the consolidated inputs. The addressed data indicators may refer to resources that the Web server is not aware of. As such, rather than let the Web server handle the request, the programming code may handle the request.

If the request is for ./CS.se{go} where % is the character sequence uniquely identifying the consolidated input, but no electronic data object exists for that character sequence, the programming code may let the Web server handle the request, which may result in an HTTP status code of 404 (Not Found).

If the value retrieved from the Accept-Encoding header from the client is "deflate" the electronic data object may be compressed using deflate without the gzip wrapper (this saves 22 bytes per response).

If the value retrieved from the Accept-Encoding header from the client is "gzip" the electronic data object may be compressed using deflate with the gzip wrapper.

It may send the electronic data object to the client by passing the following headers:

Content-Type (Set to text/css)

Last-Modified (Set to now's date and time minus one day)

Expires (Set to now's date and time plus one year)

Cache-Control (Set to public, max-age=31536000)

Content-Encoding (If the new response was compressed using deflate without the gzip wrapper, set to "deflate"; if the new response was compressed using deflate with the gzip wrapper, set to "gzip"; otherwise, this header is not set)

If the request is for ./JS.sc?{go} where % is the character sequence uniquely identifying the consolidated input, but no electronic data object exists for that character sequence, the programming code may let the Web server handle the request, which may result in an HTTP status code of 404 (Not Found).

If the value retrieved from the Accept-Encoding header from the client is "deflate" the electronic data object may be compressed using deflate without the gzip wrapper (this may save 22 bytes per response).

If the value retrieved from the Accept-Encoding header from the client is "gzip" the electronic data object may be compressed using deflate with the gzip wrapper.

It may send the electronic data object to the client by passing the following headers:

Content-Type (Set to text/javascript)

Last-Modified (Set to now's date and time minus one day)

Expires (Set to now's date and time plus one year)

Cache-Control (Set to public, max-age=31536000)

Content-Encoding (If the new response was compressed using deflate without the gzip wrapper, set to "deflate"; if the new response was compressed using deflate with the gzip wrapper, set to "gzip"; otherwise, this header is not set)

If the request is for ./IS.sc?{%} where % is the character sequence uniquely identifying the consolidated input, but no electronic data object exists for that character sequence, the programming code may let the Web server handle the request, which may result in an HTTP status code of 404 (Not Found).

If the value retrieved from the Accept-Encoding header from the client is "deflate" the electronic data object may be compressed using deflate without the gzip wrapper (this may save 22 bytes per response).

If the value retrieved from the Accept-Encoding header from the client is "gzip" the electronic data object may be compressed using deflate with the gzip wrapper.

It may send the electronic data object to the client by passing the following headers:

Content-Type (Set to the appropriate value for the image format [For example, GIF format is set to image/gif, JPEG format is set to image/jpeg, and PNG format is set to image/png])

Last-Modified (Set to now's date and time minus one day)

Expires (Set to now's date and time plus one year)

Cache-Control (Set to public, max-age=31536000)

Content-Encoding (If the new response was compressed using deflate without the gzip wrapper, set to "deflate"; if the new response was compressed using deflate with the gzip wrapper, set to "gzip"; otherwise, this header is not set)

More generally, embodiments may involve utilizing HTTP header information from at least one of said request or said response, such as by a HTTP header information utilizer (811) responsive to at least one of said client request or said server response. Utilizing HTTP header information may involve the step of utilizing at least one header selected from the group consisting of accept, accept-encoding, accept-charset, accept-language, cookie, host, referrer, user-agent, and x-forwarded-for, and the utilizer may be a utilizer utilizing these headers.

More generally, intermediating further may involve clearing the response provided by the server and providing a modified response to the client containing information related to the accessed combined electronic data object, such as with a server response clearer (812) and a modified response creator (813) responsive to information related to the accessed combined electronic data object. Such information may include header information relevant to the provision of at least some of said combined electronic data object to said client, including perhaps a header selected from the group consisting of content-encoding, content-type, and set-cookie.

More generally, intermediating further may involve receiving at least one subsequent request from a client for at least some of the combined electronic data, such as by subsequent combined electronic data client request receiver (814). The subsequent may be a request for CSS data, and intermediating may involve delivering the requested CSS data from the combined electronic data, such as by CSS data delivery system (815) responsive to said combined electronic data. Delivering may involve utilizing HTTP header information, such as by a HTTP header information utilizer (816), wherein the HTTP header information may include a header selected from the group consisting of content-type, last-modified, expires, cache-control, and content encoding, and the utilizer may be configured to utilize the same.

More generally, a subsequent request may be a request for script data, and a combined electronic data client request receiver (814) may be a script data request receiver. Intermediating further may involve delivering the requested script data from the combined electronic data, and an intermediary (806) may be a requested script data delivery system responsive to combined electronic data. Delivering may comprise utilizing HTTP header information, such as with an HTTP header information utilizer (816), and the HTTP header information may include content-type, last-modified, expires, cache-control, and content encoding, with the utilizer being configured to utilize the same.

More generally, a subsequent request may be a request for image data, and a combined electronic data client request receiver (814) may be an image data request receiver. Intermediating may involve delivering the requested image data from combined electronic data, and an intermediary (806) may be a requested image data delivery system responsive to combined electronic data. Delivering may comprise utilizing HTTP header information, such as with an HTTP header information utilizer (816), and the HTTP header information may include content-type, last-modified, expires, cache-control, and content encoding, with the utilizer being configured to utilize the same.

Embodiments may involve utilizing conventional infrastructure on at least one other side of an electronic data exchange transaction. Stated differently, self-containing implementation on one side of an electronic data exchange transaction may allow the rest of the electronic data exchange transaction to proceed using conventional infrastructure elements. Accordingly, embodiments may include an electronic data exchange transaction opposed side conventional infrastructure utilization architecture.

Embodiments therefore may be seen to allow operating externally from a conventional infrastructure, not changing a conventional infrastructure, intercepting data from a conventional infrastructure, utilizing a conventional server-client architecture, intercepting requests from a client to a server, intercepting responses from a server to a client, installing software on a conventional server, utilizing a conventional Internet transmission protocol, utilizing TCP, utilizing a conventional Internet addressing protocol, utilizing IP, utilizing a conventional Internet file transfer protocol, utilizing FTP, utilizing a conventional Internet hypertext transfer protocol, utilizing HTTP, and utilizing a networked environment, and may include architectures supporting the same.

Embodiments may involve instructing at least one counterpart side of an electronic data exchange transaction from the implementing side of the transaction. This may follow from the fact of self-containment of implementation on one side of the transaction; however, it may be understood that wherein implementation of the method may require steps at counterpart sides of the transaction, the counterpart participants may receive instructions for carrying out such steps from the implementing participant to the transaction. Accordingly, embodiments may include an electronic data exchange transaction counterpart side instruction processor (817) at an implementing side of the architecture.

For example, in a server-client architecture, where a combined electronic data object may be stored at a server, the server may instruct the client by providing information relevant to the creation of a combined electronic data indicator, such as may be associated to the combined electronic data object. Such information may include, for example, a character sequence that uniquely identifies the combined electronic object associated to the combined electronic data indicator, and may include HTTP header information, perhaps including a last-modified header, an expires header, and a cache-control header. Accordingly, embodiments may include a combined electronic data indicator creation information provision processor (818), which in various embodiments may be a processor responsive to a character sequence that uniquely identifies a combined electronic data object associated to a combined electronic data indicator (819) and a processor responsive to HTTP header information (820). Of course, this example may be merely illustrative, and should not be construed to limit the underlying principles only server-client or HTML embodiments.

Moreover, in various embodiments instructing may involve instructing a client from a server, and perhaps instructing the client only to request an electronic data object once. Accordingly, embodiments may include a client-server architecture including perhaps a client single request instruction processor (821).

An example of instructing in one embodiment may be stated as follows:

If an addressed electronic data indicator is sent in output similar to: ./CS.sc?{%}

Where % is a character sequence that uniquely identifies an electronic data object, said client is instructed to only request the electronic data object once from the server, even if the same addressed electronic indicator is present in a subsequent output to the client.

Those instructions may be sent by a server to a client by passing the following headers when the electronic data object is requested by the client:

Last-Modified (Set to now's date and time minus one day)

This header may instruct the client that the electronic data object has not been modified since exactly 24 hours ago.

Expires (Set to now's date and time plus one year)

This header may instruct the client that the electronic data object will not expire for one year, so it should not request the electronic data object again for one year.

Cache-Control (Set to public, max-age=31536000)

This header may instruct the client that the electronic data object will not expire for one year, so it should not request the electronic data object again for one year.

Naturally, self-containing implementation on one side of an electronic data exchange transaction may be implemented on any suitable side of an electronic data exchange transaction, including perhaps implementing on a server side, implementing on a client side, or implementing on an intermediary side of a transaction, with architectures suitable to support the same.

Figure 9:
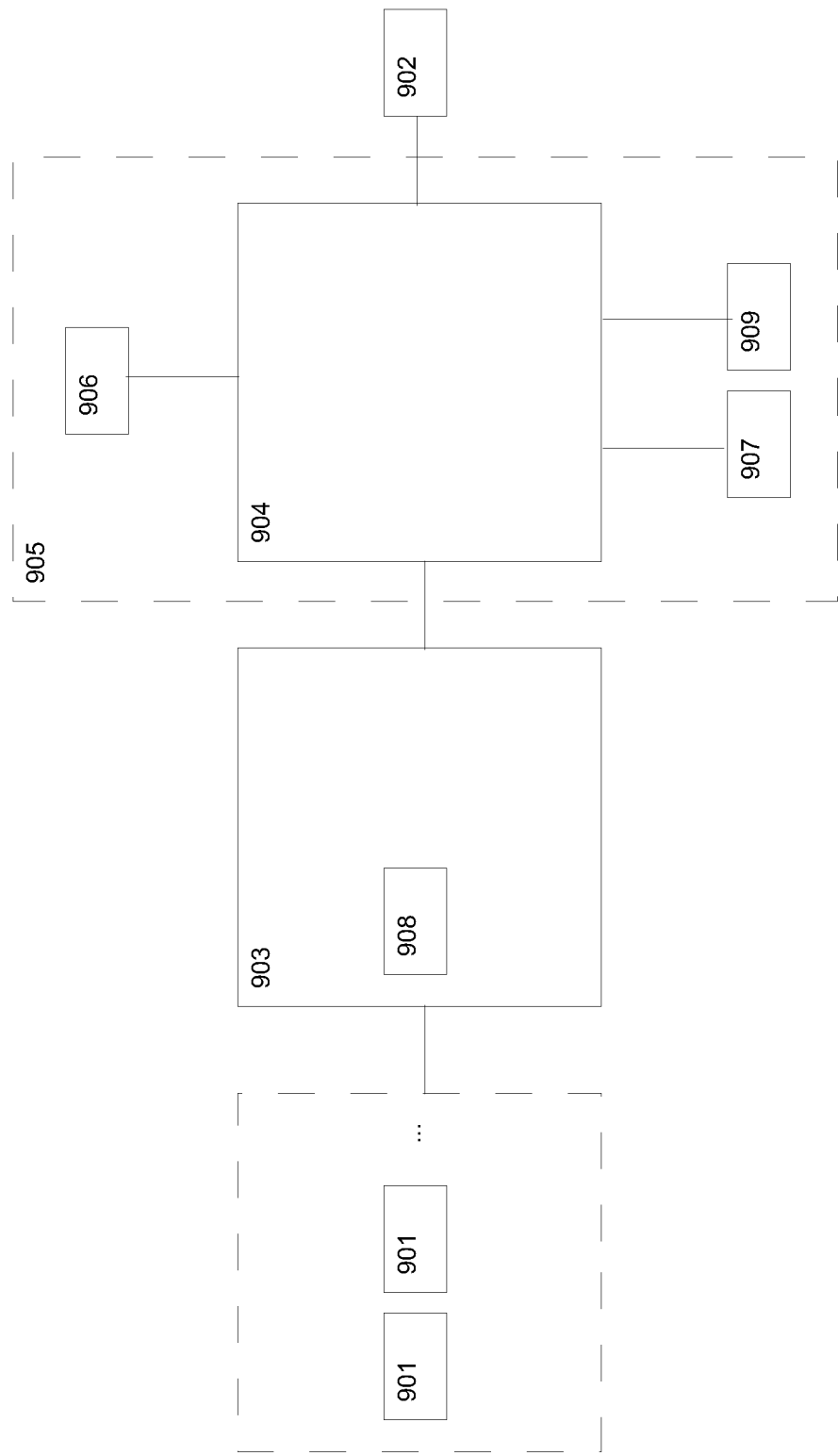
FIG. 9 is a schematic representation of a combined pointer apparatus in one exemplary embodiment.

Now with reference primarily to FIG. 9, an electronic data indicator in various embodiments may be a pointer (901), and embodiments of the inventive technology may involve combining multiple pointers (901) into a single combined pointer, such as with a single combined pointer generator (902). Combining may be understood to involve taking individual objects or indicators and integrating them into a form having at least one unitary element. Pointers (901) may be described more generally elsewhere herein.

Moreover, in various embodiments, an electronic data object (909) may be a file, and embodiments may involve pointing to at least one such file with a single combined pointer. For example, the single combined pointer may be in a Web page, or perhaps information on a client for loading a Web page, and embodiments may involve providing the file to the Web page using the single combined pointer. Accordingly, embodiments may have a single combined file pointer processor (903) responsive to a single combined pointer generator (902), wherein the processor may be a Web page single combined file pointer processor, a Web page file provision processor, or the like.

In various embodiments, providing a Web page may involve exchanging multiple requests and responses between a server (907) and a client (906), and combining multiple pointers (901) into a single combined pointer may involve reducing the number of such requests and responses. This may follow, for example, from the fact that the single combined pointer may point to just one file, rather than multiple files stored at disparate locations. Accordingly, embodiments may involve a client-server multiple request and multiple response exchange architecture (905), and a single combined pointer generator (902) may be a request and response number reducer (908).

In various embodiments, requests and responses may include HTTP header information, and embodiments may involve reducing the amount of such HTTP header information by utilizing a single combined pointer to reduce the number of such headers utilized. Reducing may involve eliminating at least 221 bytes per eliminated request header and eliminating at least 126 bytes per eliminated response header in various embodiments.

Moreover, combining multiple pointers may involve eliminating up to 500 bytes from the output, and a single combined pointer generator may be an up to 500 byte output elimination generator.

Figure 10:
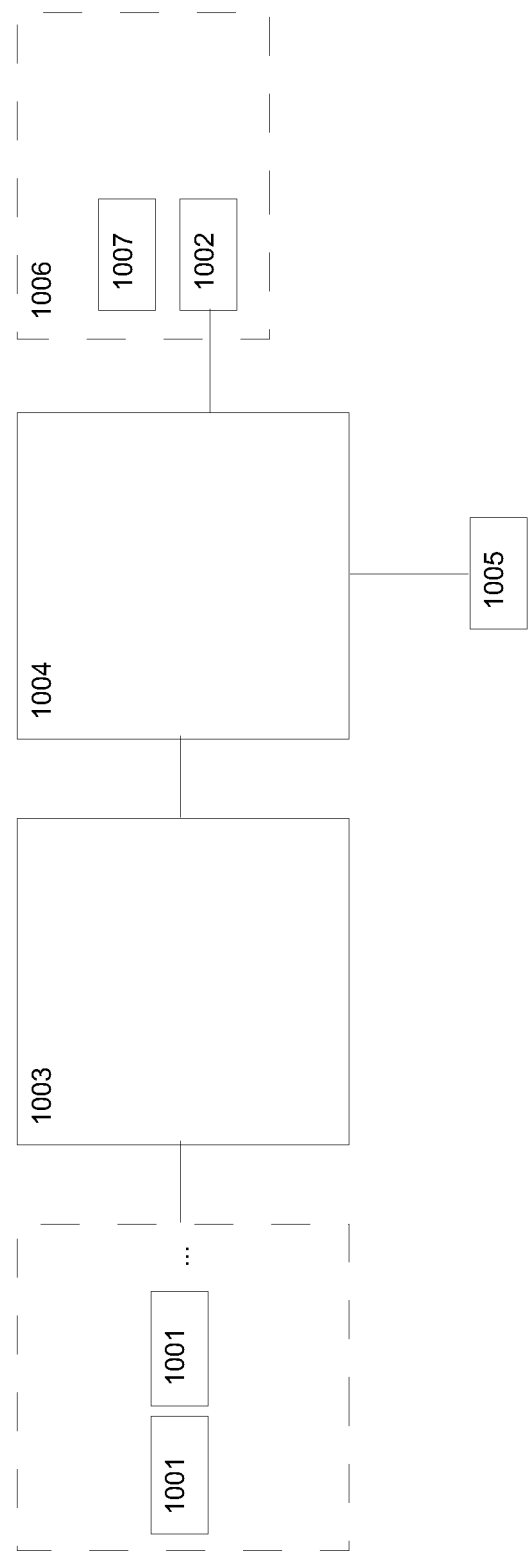
FIG. 10 is a schematic representation of a combined file apparatus in one exemplary embodiment.

Now with reference primarily to FIG. 10, an electronic data object in various embodiments may be a file (1001), and embodiments of the inventive technology may involve combining multiple files (1001) into a single combined file (1002), such as with a single combined file generator (1003). Combining may be understood to involve taking individual objects or indicators and integrating them into a form having at least one unitary element. Files (1001) may be described more generally elsewhere herein.

Moreover, in various embodiments, an electronic data indicator (1005) may be a pointer, and embodiments may involve identifying a single combined file with a pointer, such as with a single combined file indication processor (1004). For example, the single combined file may be at a single combined file hosted on a server (1006), and embodiments may involve providing the file from the server to a client using a single combined pointer, for example for the loading of a Web page. Accordingly, embodiments may have a single combined file indication processor (1004) responsive to an electronic data indicator (1005), wherein the processor may be a file server provision processor (1007), and the file may be a server hosted file, such as a server hosted single combined file.

Moreover, in various embodiments combining files may result in size savings relative to the size of the uncombined files. For example embodiments may involve combining multiple files into a single combined file having a size of up to 52.3% less than the multiple files, combining multiple CSS files into a single combined CSS file having a size of up to 35.5% less than the multiple CSS files, combining multiple script files into a single combined script file having a size of up to 16.9% less than the multiple script files, combining multiple image files into a single combined image file having a size of up to 34.8% less than the multiple image files. Accordingly, embodiments may include single combined file generators comprising reduced file size generators corresponding to the same.

Figure 11:
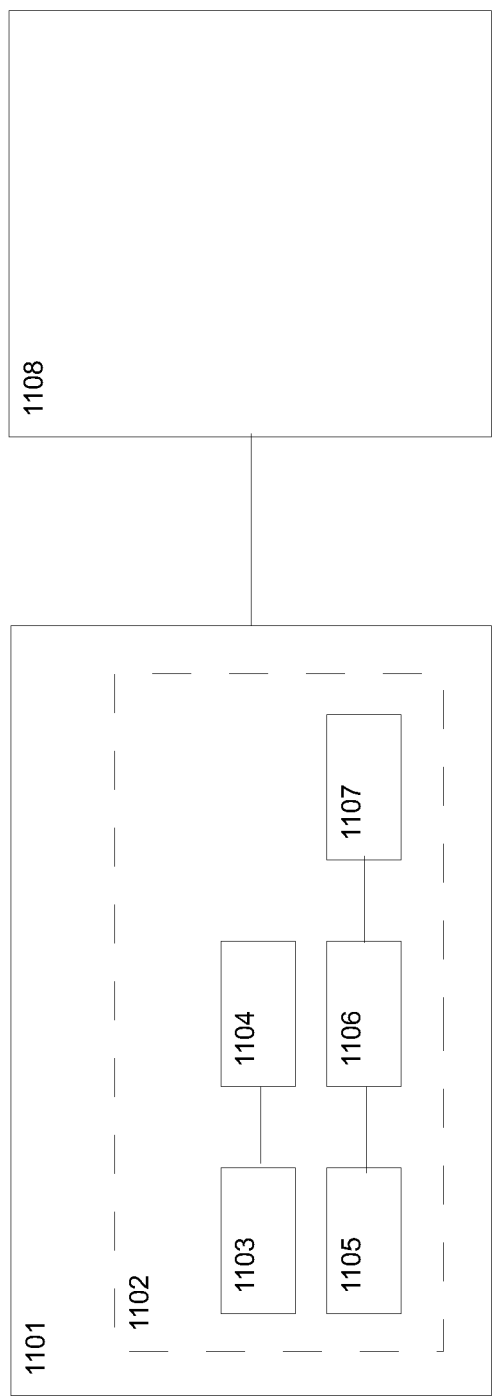
FIG. 11 is a schematic representation of a redundant executable script eliminator apparatus in one exemplary embodiment.

Now with reference primarily to FIG. 11, embodiments of the inventive technology may involve eliminating redundant executable script from at least one of a first location or a second location. Eliminating redundant executable script may be understood to include removing script from programming code that may substantially duplicate, either in structure or function, script that already exists elsewhere in such programming code. In various embodiments such executable script may be javascript. Accordingly, embodiments may include a redundant executable script eliminator (1102) at at least one of a first or second electronic storage medium (1101), where such eliminator may be a javascript redundant executable script eliminator.

An example of eliminating redundant executable script in one embodiment may be stated as follows:

An inline script may look as follows:
<script type="text/javascript">
alert('Hello World!');
</script>

In this case, the script element may be changed in output to a function call referencing a variable declared in combined input: <script type="text/javascript">eval(%);</script>

Where % is a unique character sequence.

The following variable declaration may be collocated to the combined input: var %='$';

Where % is said unique character sequence, and $ is the data inside the script element. For this to evaluate to proper JavaScript, occurrences in the data inside the script element of the "\" character may have to be replaced with "\\", occurrences in the data inside the script element of the "'" character may have to be replaced with "\'", occurrences in said data inside the script element of the "\n" line feed character may have to be replaced with "\n\", and occurrences in the data inside the script element of the "\r" carriage return character may have to be replaced with "\r\".

More generally, embodiments may involve replacing programming code in-line script with a function call referencing a variable declared elsewhere in the programming code.

Accordingly, embodiments may include a programming code in-line script replacer (1103) responsive to a function call (1104) referencing a variable declared elsewhere in the programming code.

Some embodiments may involve providing a script on one page of a multiple page Web site, providing a function call on at least one other page of the multiple page Web site, and associating the function call to the script. In this application, the function call may serve to take the place of placing script on the other pages of the multiple-page Web site, and it may be seen that redundant executable script may be eliminated. Accordingly, embodiments may include a first page script provider (1105) responsive to a multiple page Web site, a function call provider (1106) responsive to at least one other page of a multiple page Web site, and an association processor (1107) responsive to the script provider (1105) and the function call provider (1106).

Of course, eliminating redundant executable script in various embodiments may result in certain efficiencies. For example, replacing in-line script and providing a function call in various embodiments may involve saving up to 2048 bytes. Accordingly, embodiments may involve an up to 2048 bytes replacer. Embodiments further may include an electronic data transmitter (1108).

Figure 12:
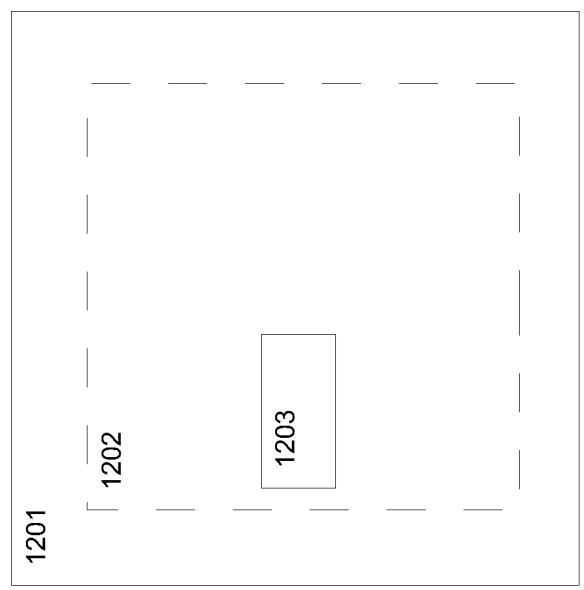
FIG. 12 is a schematic representation of a transmission overhead reducer apparatus in one exemplary embodiment.

Now with reference primarily to FIG. 12, transmitting electronic data in various embodiments may involve reducing transmission overhead. Transmission overhead generally may be understood to include the infrastructure required to support transmitting electronic data, such as in an electronic data exchange transaction. In various embodiments, for example reducing transmission overhead may involve reducing storage locations for electronic data, reducing a number of electronic data objects, recuing a number of electronic data indicators, reducing a number of electronic data exchange transactions, reducing a required electronic data transmission bandwidth, and the like.

Accordingly, embodiments may include an electronic data transmitter (1201) and a transmission overhead reducer (1202), which in various embodiments may include an electronic data storage location reducer, an electronic data object number reducer, an electronic data indicator number reducer, an electronic data exchange transaction number reducer, a required electronic data transmission bandwidth reducer, and the like.

Moreover, in some embodiments reducing transmission overhead may result in achieving effective compression, perhaps as described elsewhere herein, a transmission overhead reducer (1202) may be an effective compression achievement processor (1203).

Examples of reducing transmission overhead may include reducing HTTP header information, such as perhaps by the use of combined electronic data objects and combined electronic data indicators, and reducing HTML tag information, such as perhaps by reducing the number of locations that may be specified by HTML tags. Accordingly, in various embodiments an electronic data transmitter (1201) may be a reduced HTTP header information transmitter, a reduced HTML tag information transmitter, or the like.

Figure 13:
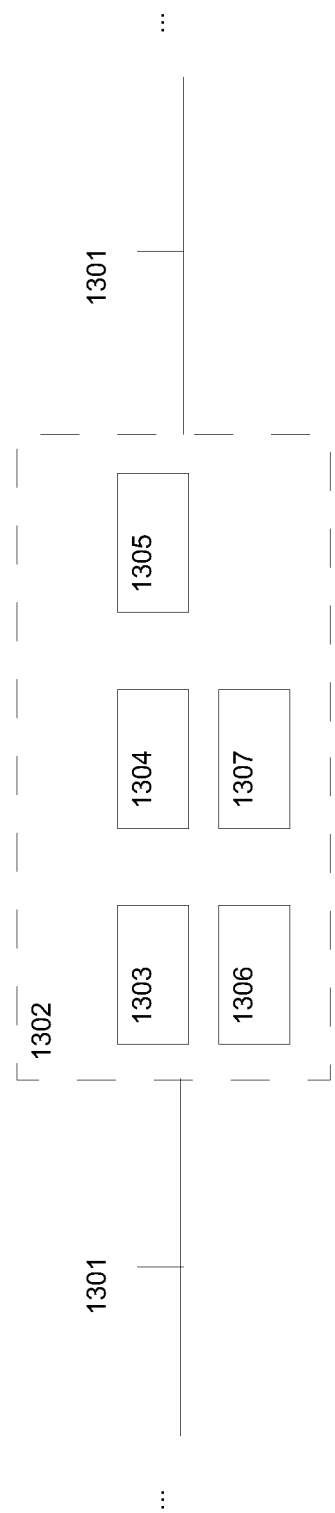
FIG. 13 is a schematic representation of an electronic communications network addition in one exemplary embodiment.

Now with reference primarily to FIG. 13, embodiments may involve adding various methods described herein to an electronic communications network (1301). The term adding may be understood as including the given method in the operation of such a network, perhaps as by complementing such operation, supplementing such operation, or the like. Accordingly, embodiments may include an electronic communications network interface (1302).

In some embodiments, adding may involve adding as a separable component (1303). A separable component (1303) may be understood to include a component that may be readily separated from the network. Examples may include a modular component, an interchangeable component, or the like. Stated differently, adding as a separable component may involve adding the subject method in such a manner that it does not become an integral part of the network itself, but rather operates alongside of the network, in conjunction with network, or the like.

Embodiments also may involve adding as a black box (1304). A black box (1304) may be understood to include devices, systems, objects, or the like which may be viewed solely in terms of their input, output, and transfer characteristics, without requiring knowledge or awareness of their internal workings. Stated differently, adding as a black box may involve adding an element to a network that creates an additional functionality for the network, requiring only input and output to and from the network, and not requiring the network to be aware of the internal operations of the black box.

Embodiments may involve adding a method by plugging and playing, as by adding a plug and play component (1305). The term plugging and playing may be understood to include adding to a network without requiring special technical support from the network, such as special connections, special hardware, special software, or the like. Stated differently, adding by plugging and playing may involve simply making a standard connection, interface, or the like between the plug and play component (1305) and the network, and realizing the functionality of the plug and play component (1305).

Moreover, in various embodiments adding may involve adding as hardware, software, adding at a server, adding at a client, adding as an intermediary, and the like, including perhaps any combination of the foregoing. Adding a method as herein described also may involve achieving effective compression of a step of transmitting electronic data, perhaps also as elsewhere described herein. Accordingly, embodiments may include an electronic data exchange transaction intermediary (1306) and a transmission effective compression achievement processor (1307).

Figure 14:
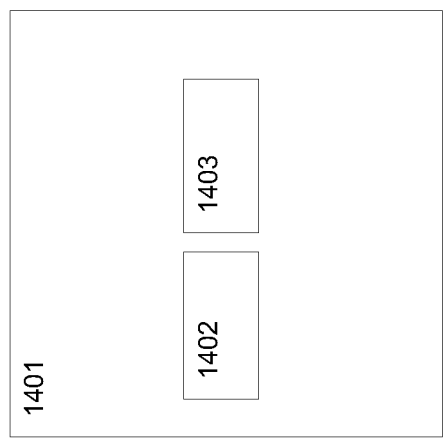
FIG. 14 is a schematic representation of an automated programming code minifier in one exemplary embodiment.

Now with reference primarily to FIG. 14, embodiments may involve automatically minifying at least some programming code, such as by an automated programming code minifier (1401). Automatically minifying may involve executing with general applicability, which may be understood to involve accepting any supported programming code generally and providing the automated minification capability. Accordingly, an automated programming code minifier (1401) in various embodiments may be a generally applicable execution automated programming code minifer.

In various embodiments, automatically minifying may involve automatically minifying on a first request for given programming code and storing the automatically minified programming code for subsequent requests for such programming code. In this manner, certain efficiencies may be achieved by avoiding unnecessarily repetitive minification of programming code. Accordingly, embodiments may include a first request automated programming code minification processor (1402) and a subsequent request automatically minified programming code storage processor (1403).

Figure 15:
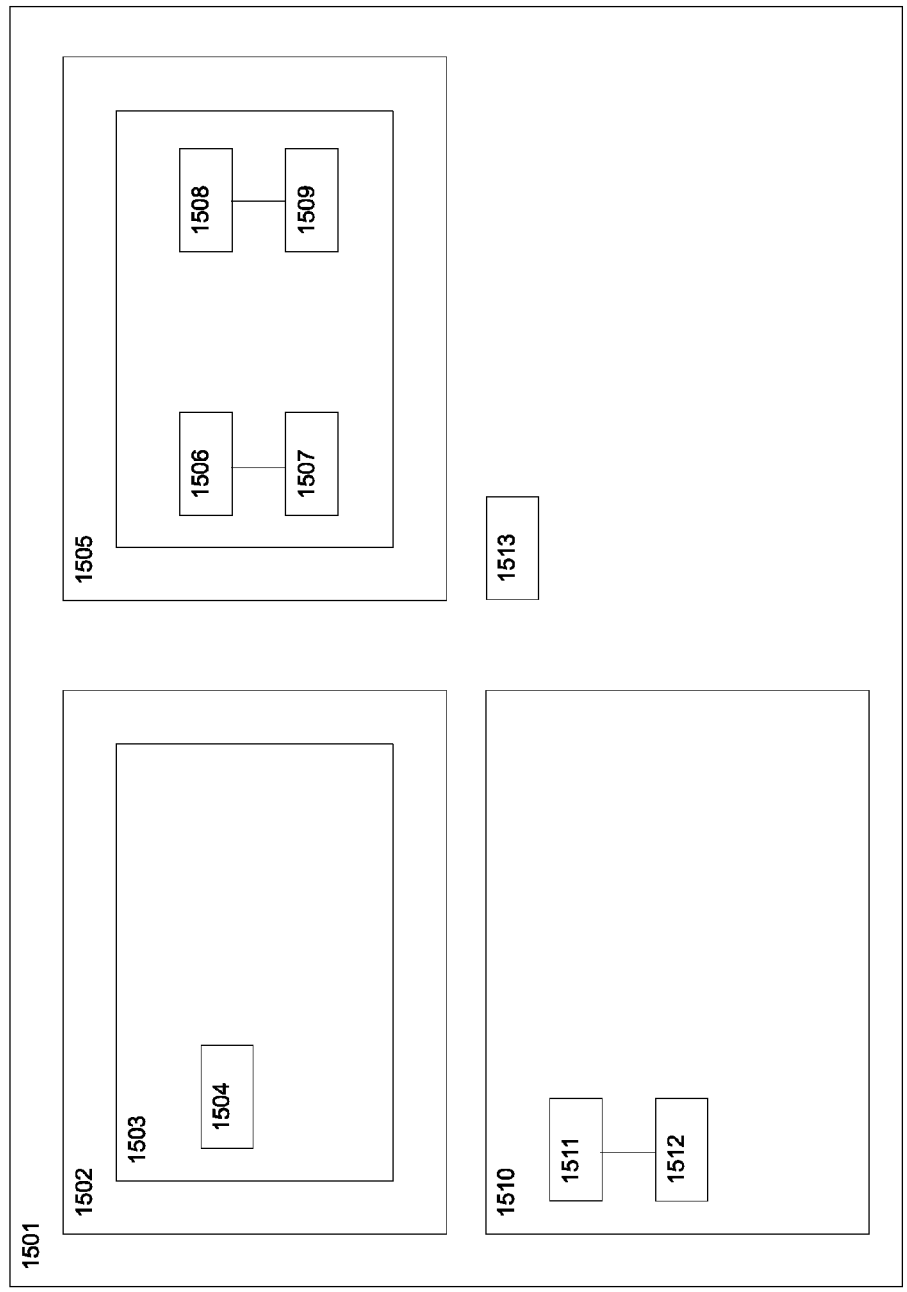
FIG. 15 is a schematic representation of a combiner programming code execution processor in one exemplary embodiment.

Now with reference primarily to FIG. 15, combining in various embodiments may involve executing programming code, such as with a programming code execution processor (1505) of a combiner (1501).

A first example of executing programming code may be stated as follows:

For a first case, an HTML element with the name "script" may look as follows:

<script type="text/javascript" src="script.js"></script>

If the value for the "src" attribute refers to a resource that can be read, the script element may be changed in output to:

<script type="text/javascript">eval(%);</script>

Where % is a unique character sequence.

The following may be collocated to consolidated input:

var %='$';

Where % is a unique character sequence, and $ is the data read from the value of the "src" attribute. For this to evaluate to proper JavaScript, occurrences in data read from the value for the "src" attribute of the "\" character may need to be replaced with "\\", occurrences in data read from the value for the "src" attribute of the "'" character may need to be replaced with "\'", occurrences in data read from the value for the "src" attribute of the "\n" line feed character may need to be replaced with "\n\", and occurrences in data read from the value for the "src" attribute of the "\r" carriage return character may need be replaced with "\r\".

For a second case, an HTML element with the name "script" may look as follows:

<script type="text/javascript"> alert('Hello World!');

</script>

In this case, the script element may be changed in output to:

<script type="text/javascript">eval(%);</script>

Where % may be a unique character sequence.

The following may be collocated to consolidated input:

var %='$';

Where % is a unique character sequence, and $ is the data inside the script element. For this to evaluate to proper JavaScript, occurrences in data inside the script element of the "\" character may need to be replaced with "\\", occurrences in said data inside the script element of the """ character may need to be replaced with "\"", occurrences in said data inside the script element of the "\n" line feed character may need to be replaced with "\n\", and occurrences in said data inside the script element of the "\r" carriage return character may need to be replaced with "\r\".

For a third case, two HTML elements with the name "img" may look like this:

<img src="image1.jpg" />
<img src="image2.jpg" />

For each element, if the value for the "src" attribute refers to a resource that can be read, the data read from the value of the src attribute is collocated to a combined input, and the img element may be changed in output to:

<img src="./IS.sc ?{%1}" style="background: url(IIS.sc ?{%2})%3px %4px no-repeat;" />
<img src="./IS.sc ?{%1}" style="background:url (IIS.sc?{%2}) %3px %4px no-repeat;" />

Where %1 is a unique character sequence that identifies a clear GIF image 1 pixel wide by 1 pixel high, %2 is a character sequence that uniquely identifies the electronic data object at the first location, %3 is the X coordinate of that image in the combined input, and %4 is the Y coordinate of the image in the consolidated input.

A second example of executing programming code may be stated as follows:

For a first case, an HTML element with the name "link" may look as follows:

<link href="style.css" rel="stylesheet" type="text/css" />

If the value for the "href" attribute refers to a resource that can be read, the entire link element may be removed from the output, and the data read from the value for the "href" attribute may be combined in the consolidated input.

For a second case, an HTML element with the name "style" may look as follows:

<style type="text/css">
  body {
    font-family: Verdana;
  }
</style>

The entire style element may be removed from the output, and the data inside the style element may be combined in consolidated input.

A third example of executing programming code may be stated as follows:

For a first case, an input may contain one or more HTML elements with the name "link," each referring to a different location of electronic data objects:

<link href="style1.css" rel="stylesheet" type="text/css" />
<link href="style2.css" rel="stylesheet" type="text/css" />

Where style1.css is the location of one electronic data object and style2.css is the location of a second electronic data object.

For each element, if the value for the "href" attribute refers to a resource that can be read, the entire link element may be removed from output, and the data read from the value for the "href" attribute may be combined in consolidated input.

The consolidated input may be stored as an electronic data object at a first location.

At the first location, a character sequence may be generated that uniquely identifies the electronic data object at the first location.

At the first location, the character sequence may be associated to the electronic data object at the first location.

At the first location, use the character sequence to address an electronic data indicator at a second location to the electronic data object at the first location by adding the following to output:

<link href="./CS.sc?{%}" rel="stylesheet" type="text/css" />

Where % is said character sequence that uniquely identifies said electronic data object at said first location.

In summary, two locations of electronic data objects:

<link href="style1.css" rel="stylesheet" type="text/css" />
<link href="style2.css" rel="stylesheet" type="text/css" />

. . . are replaced with one location of an electronic data object:

<link href="./CS.sc?{%}" rel="stylesheet" type="text/css" />

For a second case, input may contain one or more HTML elements with the name "script," each referring to a different location of electronic data objects:

<script type="text/javascript" src="script1.js"></script>
<script type="text/javascript" src="script2.js"></script>

Where script1.js is the location of one electronic data object and script2.js is the location of a second electronic data object.

For each element, if the value for the "src" attribute refers to a resource that can be read, the data read from the value of the src attribute may be combined to consolidated input.

The consolidated input may be stored as an electronic data object at a first location.

At the first location, a character sequence is generated that uniquely identifies the electronic data object at the first location.

At the first location, said character sequence is associated to the electronic data object at the first location.

At the first location, use the character sequence to address the electronic data indicator at the second location to the electronic data object at said first location by adding the following to said output:

<script type="text/javascript" src="./JS.sc?{%}"></script>

Where % is said character sequence that uniquely identifies said electronic data object at said first location.

In summary, two locations of said electronic data objects:

<script type="text/javascript" src="script1.js"></script>
<script type="text/javascript" src="script2.js"></script>

. . . are replaced with one location of said electronic data object:

<script type="text/javascript" src="./JS.sc?{%}"></script>

For a third case, input may contain one or more HTML elements with the name "img," each referring to a different location of electronic data objects:

<img src="image1.jpg" />
<img src="image2.jpg" />

Where image1.jpg is the location of one electronic data object and image2.jpg is the location of a second electronic data object.

For each element, if the value for the "src" attribute refers to a resource that can be read, the data read from the value of the src attribute may be collocated to input.

The combined input may be stored as an electronic data object at a first location.

At the first location, a character sequence is generated that uniquely identifies the electronic data object at the first location.

At the first location, the character sequence is associated to the electronic data object at said first location.

At the first location, use said character sequence to address an electronic data indicator at the second location to the electronic data object at the first location by changing:

<img src="image1.jpg" />

... to:

<img src="./IS.sc?{%1}" style="background:url (IIS.sc?{%2} %3px %4px;" />

... and by changing:

<img src="image2.jpg" />

... to:

<img src="./IS.sc?{%1}" style="background:url (IIS.sc?{%2} %3px %4px;" />

Where %1 is a character sequence that uniquely identifies an electronic data object at the first location that is a 1 pixel wide by 1 pixel high transparent GIF image, %2 is the character sequence that uniquely identifies the electronic data object at the first location, %3 is the X coordinate of the image in said electronic data object, and %4 is the Y coordinate of the image in the electronic data object.

And where %1 and %2 are the same for each img element.

In summary, two locations of said electronic data objects:

<img src="image1.jpg" />
<img src="image2.jpg" />

... are replaced with one location of said electronic data object:

<img src="./IS.sc?{% 1}" style="background:url (ITS.sc?{%2} %3px % 4px;" />
<img src="./IS.sc?{% 1}" style="background:url (ITS.sc?{%2} %3px % 4px;" />

A fourth example of executing programming code may be stated as follows:

According to https://developers.google.com/speed/articles/web-metrics, a Web page refers to an average of 39.7 locations of said electronic data objects (3.22 styles, 7.09 scripts, and 29.39 images) via an average of 39.7 said electronic indicators.

Without this method, the input would contain 3.22 electronic indicators for styles:

<link href="style1.css" rel=" style sheet" type="text/css" />
<link href="style2.css" rel=" style sheet" type="text/css" />
<link href="style3.css" rel=" style sheet" type="text/css" />

With this method, those three inputs can be combined, so they are removed from said output, combined in said consolidated input, and the following electronic indicator is added to said output:

<link href="./CS.sc?{%}" rel="stylesheet" type="text/css" />

Where % is said character sequence that uniquely identifies said electronic data object at said first location.

In summary, three locations of said electronic indicators:

<link href="style1.css" rel="stylesheet" type="text/css" />
<link href="style2.css" rel="stylesheet" type="text/css" />
<link href="style3.css" rel="stylesheet" type="text/css" />

... Are replaced with one location of said electronic indicator:

<link href="./CS.sc?{%}" rel="stylesheet" type="text/css" />

Without this method, the input would contain 7.09 electronic indicators for scripts:

<script type="text/javascript" src="script1.js"></script>
<script type="text/j avascript" src="script2.js"></script>
<script type="text/j avascript" src="script3.js"></script>
<script type="text/j avascript" src="script4.js"></script>
<script type="text/j avascript" src="script5.js"></script>
<script type="text/j avascript" src="script6.js"></script>
<script type="text/j avascript" src="script7.js"></script>

With this method, those seven inputs can be collocated, so they are mostly removed from said output and collocated to said consolidated input, and the following electronic indicator is added to said output:

<script type="text/javascript" href="./JS.sc?{%}"></script>

Where % is said character sequence that uniquely identifies said electronic data object at said first location.

In summary, seven locations of said electronic indicators:

<script type="text/javascript" src="script1.js"></script>
<script type="text/javascript" src="script2.js"></script>
<script type="text/j avascript" src="script3.js"></script>
<script type="text/javascript" src="script4.js"></script>
<script type="text/javascript" src="script5.js"></script>
<script type="text/javascript" src="script6.js"></script>
<script type="text/javascript" src="script7.js"></script>

... Are replaced with one location of said electronic indicator:

<script type="text/javascript" href="./JS.sc?{%}"></script>

Without this method, the input would contain 29.39 electronic indicators for images:

<img src="image1.jpg" />
<img src="image2.jpg" />
<img src="image3.jpg" />
<img src="image4.jpg" />
<img src="image5.jpg" />
<img src="image6.jpg" />
<img src="image7.jpg" />
<img src="image8.jpg" />
<img src="image9.jpg" />
<img src="image10.jpg" />
<img src="image11.jp g" />
<img src="image12.jpg" />
<img src="image13.jpg" />
<img src="image14.jpg" />
<img src="image15.jpg" />
<img src="image16.jpg" />
<img src="image17.jpg" />
<img src="image18.jpg" />
<img src="image19.jpg" />
<img src="image20.jpg" />
<img src="image21.jpg" />
<img src="image22.jpg" />
<img src="image23.jpg" />
<img src="image24.jpg" />
<img src="image25.jpg" />
<img src="image26.jpg" />
<img src="image27.jpg" />
<img src="image28.jpg" />
<img src="image29.jpg" />

With this method, those twenty-nine inputs can be collocated, so they are mostly removed from said output and collocated to said consolidated input, and their electronic indicators changed to the following in said output:

```
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:
   url(IIS.sc ?{%2}) %3px %4px no-repeat;" />
<img     src="./IS.sc?{%1}"     style="background:url
   (IIS.sc?{%2}) %3px %4px no-repeat;"/>\
<img     src="./IS.sc?{%1}"     style="background:url
   (IIS.sc?{%2}) %3px %4px no-repeat;" />
<img     src="./IS.sc     ?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url(./
   IS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
```

Where %1 is a character sequence that uniquely identifies an electronic data object at a first location that is a 1 pixel wide by 1 pixel high transparent GIF image, %2 is a character sequence that uniquely identifies said electronic data object at a first location, %3 is the X coordinate of the image in the electronic data object, and %4 is the Y coordinate of the image in the electronic data object.

And where %1 and %2 are the same for each img element.

In summary, twenty-nine locations of said electronic indicators:

```
<img src="image1.jpg" />
<img src="image2.jpg" />
<img src="image3.jpg" />
<img src="image4.jpg" />
<img src="image5.jpg" />
<img src="image6.jpg" />
<img src="image7.jpg" />
<img src="image8.jpg" />
<img src="image9.jpg" />
<img src="image10.jpg" />
<img src="image 11.jpg" />
<img src="image12.jpg" />
<img src="image13.jpg" />
<img src="image14.jpg" />
<img src="image15.jpg" />
<img src="image16.jpg" />
<img src="image17.jpg" />
<img src="image18.jpg" />
<img src="image19.jpg" />
<img src="image20.jpg" />
<img src="image21.jpg" />
<img src="image22.jpg" />
<img src="image23.jpg" />
<img src="image24.jpg" />
<img src="image25.jpg" />
<img src="image26.jpg" />
<img src="image27.jpg" />
<img src="image28.jpg" />
<img src="image29.jpg" />
```

. . . Are replaced with one location of said electronic indicator:

```
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;" />
<img     src="./IS.sc?{%1}"     style="background:url
   (IIS.sc?{%2}) %3px %4px no-repeat;"/>\
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
<img     src="./IS.sc?{%1}"     style="background:url
   (IIS.sc?{%2}) %3px %4px no-repeat;"/>
```

```
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
<img    src="./IS.sc?{%1}"    style="background:url
    (IIS.sc?{%2}) %3px %4px no-repeat;"/>
```

A fifth example of executing programming code may be stated as follows:

When the following input is encountered:

`<link href=" style.css" rel="stylesheet" type="text/css"/>`

... If the value for the "href" attribute refers to a resource that can be read, the data read from the value of the href attribute may be contiguously combined in the consolidated CSS input. By doing this sequentially, said second location may exhibit the same behavior as if the input was not consolidated.

When the following input is encountered:

```
<style type="text/css">
  body {
    font-family: Verdana;
  }
</style>
```

... The data inside the style element may be contiguously combined in the consolidated CSS input. By doing this sequentially, the second location may exhibit the same behavior as if the input was not consolidated.

When the following input is encountered:

`<script type="text/javascript" src="script.js"></script>`

... If the value for the "src" attribute refers to a resource that can be read, the data read from the value of the src attribute may be contiguously combined in the consolidated Javascript input as:

var %='$';

Where % is said unique character sequence, and $ is the data read from the value of the "src" attribute. For this to evaluate to proper JavaScript, occurrences in data read from the value for the "src" attribute of the "\" character may need to be replaced with "\\", occurrences in data read from the value for the "src" attribute of the """ character may need to be replaced with "\"", occurrences in data read from the value for the "src" attribute of the "\n" line feed character may need to be replaced with "\n\"", and occurrences in data read from the value for the "src" attribute of the "\r" carriage return character may need to be replaced with "\r\"".

By doing this sequentially, the second location may exhibit the same behavior as if the input was not consolidated.

When the following input is encountered:

```
<script type="text/javascript">
  alert('Hello World!');
</script>
```

... The data inside the script element may be contiguously combined in the consolidated Javascript input as:

var %='$';

Where % is said unique character sequence, and $ is the data inside the script element. For this to evaluate to proper JavaScript, occurrences in data inside the script element of the "\" character may need to be replaced with "\\", occurrences in data inside the script element of the """ character may need to be replaced with "\"", occurrences in data inside the script element of the "\n" line feed character may need to be replaced with "\n\"", and occurrences in data inside the script element of the "\r" carriage return character may need to be replaced with "\r\"".

By doing this sequentially, the second location may exhibit the same behavior as if the input was not consolidated.

When the following input is encountered:

`<img src="image.jpg" />`

... If the value for the "src" attribute refers to a resource that can be read, the data read from the value of the src attribute may be hierarchically combined in the consolidated image input.

More generally, embodiments may involve substituting at least one preexisting programming code element referring to uncombined electronic data with at least one substituted programming code element referring to combined electronic data. Accordingly, embodiments may include a preexisting programming code element removal processor (1506) responsive to an uncombined electronic data reference (1507) and a substituted programming code element substitution processor (1508) responsive to a combined electronic data reference (1509). In various embodiments, a preexisting programming code element may include an HTML attribute referring to a resource that can be read, and the substituted programming code element may be a unique character sequence identifying the resource as part of the combined electronic data. Embodiments further may involve retrieving a resource from a location other than the location of the combined electronic data. Accordingly, embodiments may include a combined electronic data resource retrieval processor (1510).

More generally, embodiments may involve removing a preexisting programming code element and incorporating a value for said preexisting programming code element into combined electronic data. Accordingly, embodiments may include a preexisting programming code element removal processor (1511) and a preexisting programming code element value incorporation processor (1512) responsive to said combined electronic data. Moreover, a preexisting programming code element in various embodiments may be an HTML attribute referring to a resource that can be read. Embodiments further may involve avoiding requiring an initial request for said resource. Accordingly, embodiments may include an initial request avoidance processor (1513).

Additionally, in various embodiments, combining may comprise collocating with a collector.

Embodiments also may involve retaining individual attributes of each combined element. This may include separately utilizing at least one such constituent element, perhaps such as utilizing at least one electronic data object individually. Utilizing further may involve retrieving an individual file. Accordingly, embodiments may include a combiner (1501), a constituent element separate utilization processor (1502), an individual electronic data object utilization processor (1503), and an individual file retrieval processor (1504).

Now with reference to FIGS. 1-19, various steps of transmitting electronic data described herein may involve utilizing conventional network transmission elements. Such elements should be understood to include, but not be limited to TCP/IP, FTP, HTTP, client-server architectures, the World Wide Web, networked environments, wire line elements, wireless elements, mobile computing devices, and the like. Consistent with the principles described herein, the inventive technology may be capable of use with and may involve using an unaltered transmission protocol, including but not limited to using unaltered TCP, using an unaltered addressing protocol, including but limited to using unaltered IP, using an unaltered hypertext protocol, including but not limited to using an unaltered HTTP, using an unaltered file transfer protocol, including but not limited to using unaltered FTP, and the like.

With further reference to FIGS. 1-19, the methods and apparatus described herein naturally may be implemented with any suitable hardware, software, hardware objects, software objects, servers, clients, intermediaries, or the like.

With further reference to FIGS. 1-19, as used herein throughout, the term automated and its associated constructions may be understood to include having the capability of operating independently, perhaps such as without substantial human intervention or supervision.

With further reference to FIGS. 1-19, the methods and apparatus described herein may have particular suitability to loading of Web pages among servers and clients, wherein the client may have pointers pointing to information required for the Web page on the server, but of course may be more generally applicable to any suitable storage and transmission of electronic data, and should not be construed to be limited simply to World Wide Web architectures.

As can be easily understood from the foregoing, the basic concepts of the present inventive technology may be embodied in a variety of ways. It involves both electronic data storage and transmission techniques as well as devices to accomplish the appropriate electronic data storage and transmission. In this application, the electronic data storage and transmission techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "transmitter" should be understood to encompass disclosure of the act of "transmitting" —whether explicitly discussed or not— and, conversely, were there effectively disclosure of the act of "transmitting", such a disclosure should be understood to encompass disclosure of a "transmitter" and even a "means for transmitting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference.

Finally, all references listed in the list of References To Be Incorporated By Reference or other information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

Thus, the applicant(s) should be understood to have support to claim and make a statement of invention to at least: i) each of the electronic data storage and transmission devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for transmitting electronic data comprising the steps of:
   storing multiple data files at a server;
   storing multiple data pointers at a client;
   automatically identifying at least one characteristic of each said data file relevant to a threshold criterion for combining said multiple data files;
   automatically determining if said threshold criterion for combining said multiple data files has been satisfied;
   automatically combining said multiple data files into a single combined data file in accordance with said automatic determination if said threshold criterion;
   automatically combining said multiple data pointers into a single combined data pointer at said client;
   automatically associating said single combined data file at said server to said single combined data pointer at said client;
   automatically linking said server to said client via an electronic data communications network;
   automatically effectively compressing at least one request from said client for at least one said data file at said server with said single combined pointer at said client;
   automatically effectively compressing provision from said server of at least one said data file to said client with said single combined data pointer at said client;
   automatically transmitting said data file from said server to said client via said electronic data communications network at an effective network transmission rate greater than a benchmark network transmission rate for said electronic data communications network.

2. A method for transmitting electronic data as described in claim 1 wherein said steps of automatically effectively compressing comprise the step of leveraging a combination efficiency.

3. A method for transmitting electronic data as described in claim 1 wherein said steps of automatically effectively compressing comprise the step of using said data association to request and provide at least one said file individually.

4. A method for transmitting electronic data as described in claim 1 further comprising the step of self-containing implementation of said method on one side of an electronic data exchange transaction.

5. A method for transmitting electronic data as described in claim 4 wherein said step of self-containing implementation comprises the step of avoiding counterpart implementation of said method on at least one other side of said electronic data exchange transaction.

6. A method for transmitting electronic data as described in claim 4 wherein said step of self-containing implementation comprises the step of instructing at least one counterpart side of said electronic data exchange transaction from the implementing side of said electronic data exchange transaction.

7. A method for transmitting electronic data as described in claim 1 further comprising the step of eliminating redundant javascript at said client.

8. A method for transmitting electronic data as described in claim 1 further comprising the step of using said method with unaltered TCP/IP.

9. A method for transmitting electronic data as described in claim 1 further comprising the step of the step of retaining individual attributes of each said data file.

10. A method for transmitting electronic data as described in claim 1 wherein said step of automatically combining said multiple data files into a single combined data file comprises the step of executing programming code.

11. A method for transmitting electronic data as described in claim 10 wherein said step of executing programming code comprises the step of substituting at least one preexisting programming code element referring to said multiple data files with at least one substituted programming code element referring to said single combined data file.

12. A method for transmitting electronic data as described in claim 11 wherein said programming code comprises HTML programming code, wherein said preexisting programming code element comprises an HTML attribute referring to a resource that can be read, and wherein said substituted programming code element comprises a unique character sequence identifying said resource as part of said combined data file.

13. A method for transmitting electronic data as described in claim 12 further comprising the step of avoiding retrieving said resource from a location other than said single combined data file.

14. A method for transmitting electronic data as described in claim 1 wherein said method comprises the step of reducing transmission overhead.

15. A method for transmitting electronic data as described in claim 14 wherein said step of reducing transmission overhead comprises a step selected from the group consisting of reducing server storage locations for data files, reducing a number of data files, reducing a number of data pointers, reducing a number of electronic data exchange transactions, and reducing a required electronic data transmission bandwidth.

16. An electronic data transmission apparatus comprising:
   a server having multiple data files stored thereon;
   a client having multiple data pointers stored thereon;
   an automated threshold criterion combination characteristic identifier responsive to said server;
   an automated threshold criterion determiner responsive to said automated threshold criterion combination characteristic identifier;

an automated data file combiner responsive to said automated threshold criterion determiner and to which said server having multiple data files stored thereon is responsive;

an automated data pointer combiner to which said client having said multiple data pointers stored thereon is responsive;

an automated data associator responsive to said automated data file combiner and said automated data pointer combiner;

an electronic data communications network linking said server to said client;

an automated data file request and provide effective compressor responsive to said automated data associator and to which said server having said multiple data files stored thereon and said client having said multiple data pointers stored thereon are responsive;

an automated data file transmission effective rate augmenter responsive to a benchmark network transmission rate for said electronic data communications network and to which said server, said client, and said electronic data communications network linking said server to said client are responsive.

17. An electronic data transmission apparatus as described in claim 16 wherein said automated data file request and provide effective compressor comprises a combination efficiency leverage system.

18. An electronic data transmission apparatus as described in claim 16 wherein said automated data file request and provide effective compressor comprises an individual data file request and provision system having an associated data processor.

19. An electronic data transmission apparatus as described in claim 16 further comprising a one-sided self-contained electronic data exchange transaction implementation architecture.

20. An electronic data transmission apparatus as described in claim 19 wherein said one-sided self-contained electronic data exchange transaction implementation architecture comprises an electronic data exchange transaction opposed side counterpart implementation avoidance processor.

21. An electronic data transmission apparatus as described in claim 19 wherein said one-sided self-contained electronic data exchange transaction implementation architecture comprises an electronic data exchange transaction counterpart side instruction processor at said implementing side of said architecture.

22. An electronic data transmission apparatus as described in claim 16 further comprising a redundant javascript eliminator at at least one of said server or said client.

23. An electronic data transmission apparatus as described in claim 16 further comprising an electronic data transmitter utilizing unaltered TCP/IP.

24. An electronic data transmission apparatus as described in claim 16 wherein said automated data file combiner comprises a constituent data file individual attribute retention processor.

25. An electronic data transmission apparatus as described in claim 16 wherein said automated data file combiner comprises a programming code execution processor.

26. An electronic data transmission apparatus as described in claim 25 wherein said programming code execution processor comprises a preexisting programming code element removal processor responsive to an uncombined data file reference and a substituted programming code element substitution processor responsive to a combined data file reference.

27. An electronic data transmission apparatus as described in claim 26 wherein said programming code comprises HTML programming code, wherein said preexisting programming code element comprises an HTML attribute referring to a resource that can be read, and wherein said substituted programming code element comprises a unique character sequence identifying said resource as part of said combined data file.

28. An electronic data transmission apparatus as described in claim 27 further comprising a combined data file resource retrieval processor.

29. An electronic data transmission apparatus as described in claim 16 wherein said apparatus comprises a transmission overhead reducer.

30. An electronic data transmission apparatus as described in claim 29 wherein said transmission overhead reducer comprises a reducer selected from the group consisting of a server storage location reducer, an data file number reducer, a data pointer reducer, an electronic data exchange transaction number reducer, and a required electronic data transmission bandwidth reducer.

* * * * *